United States Patent
Yoshino et al.

(10) Patent No.: US 12,013,470 B2
(45) Date of Patent: Jun. 18, 2024

(54) SERVER, SATELLITE POSITIONING SYSTEM, AND SATELLITE POSITIONING METHOD

(71) Applicant: Panasonic Intellectual Property Management Co., Ltd., Osaka (JP)

(72) Inventors: Kazuyuki Yoshino, Tokyo (JP); Kunihiko Sakaibara, Kanagawa (JP); Jun Shibata, Kanagawa (JP); Yasuhisa Yamazaki, Kanagawa (JP); Yoshimasa Shirosaki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 570 days.

(21) Appl. No.: 17/287,747

(22) PCT Filed: Aug. 26, 2019

(86) PCT No.: PCT/JP2019/033369
§ 371 (c)(1),
(2) Date: Apr. 22, 2021

(87) PCT Pub. No.: WO2020/084889
PCT Pub. Date: Apr. 30, 2020

(65) Prior Publication Data
US 2021/0396889 A1    Dec. 23, 2021

(30) Foreign Application Priority Data

Oct. 24, 2018 (JP) .................. 2018-199918

(51) Int. Cl.
*G01S 19/28* (2010.01)
*G01S 19/22* (2010.01)
*G01S 19/43* (2010.01)

(52) U.S. Cl.
CPC .............. *G01S 19/28* (2013.01); *G01S 19/22* (2013.01); *G01S 19/43* (2013.01)

(58) Field of Classification Search
CPC .......... G01S 19/09; G01S 19/22; G01S 19/28
See application file for complete search history.

(56) References Cited

U.S. PATENT DOCUMENTS

| 10,037,231 B1* | 7/2018 | Jakhetiya | G06F 9/5072 |
| 2015/0061934 A1* | 3/2015 | Liu | G01S 19/28 |
| | | | 342/357.69 |

(Continued)

FOREIGN PATENT DOCUMENTS

| JP | 2001-272451 | 10/2001 |
| JP | 2001272451 A * | 10/2001 |

(Continued)

OTHER PUBLICATIONS

International Search Report (ISR) from International Searching Authority (Japan Patent Office) in International Pat. Appl. No. PCT/JP2019/033369, dated Nov. 19, 2019, along with an English translation thereof.

*Primary Examiner* — Bernarr E Gregory
*Assistant Examiner* — Fred H Mull
(74) *Attorney, Agent, or Firm* — GREENBLUM & BERNSTEIN, P.L.C.

(57) ABSTRACT

The present application: receives positioning data from each of a plurality of positioning terminals that have received positioning signals transmitted from a plurality of satellites; uses the received positioning data to detect, for each satellite, the difference between the positioning signal reception quality at a first positioning terminal and the positioning signal reception quality at at least one second positioning (Continued)

terminal; and uses the difference for each satellite to determine a satellite to be used for positioning computation for the first positioning terminal.

8 Claims, 17 Drawing Sheets

(56) References Cited

U.S. PATENT DOCUMENTS

| | | | |
|---|---|---|---|
| 2015/0378025 A1 | 12/2015 | Kim et al. | |
| 2016/0116601 A1* | 4/2016 | Horn | G01S 19/51 |
| | | | 342/357.27 |
| 2016/0259061 A1* | 9/2016 | Carter | G01S 19/28 |

FOREIGN PATENT DOCUMENTS

| | | | |
|---|---|---|---|
| JP | 2003-185731 | | 7/2003 |
| JP | 2005-321364 | | 11/2005 |
| JP | 2005321364 A | * | 11/2005 |
| JP | 2006-090912 | | 4/2006 |
| JP | 5232994 | | 7/2013 |
| JP | 2016-118493 | | 6/2016 |
| JP | 2016118493 A | * | 6/2016 |
| WO | 2006/132003 | | 12/2006 |

* cited by examiner

SERVER, SATELLITE POSITIONING SYSTEM, AND SATELLITE POSITIONING METHOD

TECHNICAL FIELD

The present disclosure relates to a server, a satellite positioning system, and a satellite positioning method.

BACKGROUND ART

Positioning systems utilizing interference positioning (Real Time Kinematic (RTK) calculation) by an RTK method have conventionally been considered in order to measure positions of objects such as moving objects with high accuracy. The RTK method is a method of performing positioning at a predetermined point using a positioning signal transmitted by a satellite. Application of the positioning by the RTK method is expected to achieve positioning with high accuracy.

When performing the RTK calculation, a positioning terminal receives a positioning signal transmitted from a satellite (not illustrated) of a Global Navigation Satellite System (GNSS), and generates positioning data using the positioning signal. Note that, GNSS is a generic term for satellite navigation systems with performance (accuracy and reliability) available for civil aviation navigation such as a global positioning system (GPS), a BeiDou Navigation Satellite System (BeiDou), and GLONASS. The positioning signal includes, for example, an L1 signal (1575.42 MHz) and an L2 signal (1227.60 MHz) transmitted from a GPS satellite.

CITATION LIST

Patent Literature

PTL 1
WO 2006/132003
PTL 2
Japanese Patent Application Laid-Open No. 2016-118493

SUMMARY OF INVENTION

Technical Problem

Studies have been carried out on reducing processing load and cost of the positioning terminal by, for example, sharing the RTK calculation, which is conventionally performed by the positioning terminal, between the positioning terminal and a cloud server (for example, centralized on the cloud server).

In the RTK calculation, it is expected in general to improve the positioning accuracy by precisely determining the positioning signal affected by multipath and excluding the signal from the RTK calculation. The conventional configuration of performing the RTK calculation by the positioning terminal, however, makes it harder to determine whether the positioning signal is affected by multipath unless the reception quality of the positioning signal is extremely poor.

One non-limiting and exemplary embodiment facilitates providing a satellite positioning technology for improving the positioning accuracy by precisely determining a positioning signal affected by multipath and excluding the signal from positioning calculation, in the RTK calculation using a cloud server.

Solution to Problem

A server according to an aspect of the present disclosure includes: a receiver, which in operation, receives, from each of a plurality of positioning terminals receiving positioning signals transmitted from a plurality of satellites, positioning data generated based on the positioning signals; a processor, which in operation, performs positioning calculation for a position of a first positioning terminal among the plurality of positioning terminals; and an output, which in operation, outputs a result of the positioning calculation, wherein the processor detects a difference, for each of the plurality of satellites based on the positioning data, between reception quality of the positioning signal in the first positioning terminal and reception quality of the positioning signal in at least one second positioning terminal, and determines at least one of the plurality of satellites to be used for the positioning calculation for the first positioning terminal, based on the difference for each of the plurality of satellites.

A satellite positioning system according to an aspect of the present disclosure includes: a plurality of positioning terminals that generate positioning data based on positioning signals received from a plurality of satellites; and a server that receives the positioning data from each of the plurality of positioning terminals, performs positioning calculation for a position of a first positioning terminal among the plurality of positioning terminals, and outputs a result of the positioning calculation, wherein the server detects a difference, for each of the plurality of satellites based on the positioning data, between reception quality of the positioning signal in the first positioning terminal and reception quality of the positioning signal in at least one second positioning terminal, and determines at least one of the plurality of satellites to be used for the positioning calculation for the first positioning terminal, based on the difference for each of the plurality of satellites.

A satellite positioning method according to an aspect of the present disclosure includes: transmitting to a server, by each of a plurality of positioning terminals, positioning data generated based on positioning signals received from a plurality of satellites; detecting, by the server, for each of the plurality of satellites based on the positioning data, a difference between reception quality of the positioning signal in a first positioning terminal and reception quality of the positioning signal in at least one second positioning terminal; determining, by the server, at least one of the plurality of satellites to be used for the positioning calculation for the first positioning terminal, based on the difference for each of the plurality of satellites; and performing, by the server, positioning calculation for a position of the first positioning terminal based on a result of the determination, and outputs a result of the positioning calculation.

It should be noted that general or specific embodiments may be implemented as a system, an apparatus, a method, an integrated circuit, a computer program, a storage medium, or any selective combination thereof.

Advantageous Effects of Invention

According to an aspect of the present disclosure, it is possible to improve the positioning accuracy by precisely determining a positioning signal affected by multipath and excluding the signal from positioning calculation.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, embodiments of the present invention will be described in detail with reference to the drawings as appropriate. However, a detailed description more than necessary may be omitted, such as a detailed description of an already well-known matter and a duplicate description for a substantially identical configuration, to avoid unnecessary redundancy of the following description and to facilitate understanding by the person skilled in the art.

Note that, the accompanying drawings and the following description are provided for the person skilled in the art to sufficiently understand the present disclosure, and are not intended to limit the subject matter described in the claims.

<Configuration of Satellite Positioning System>

Figure 1:
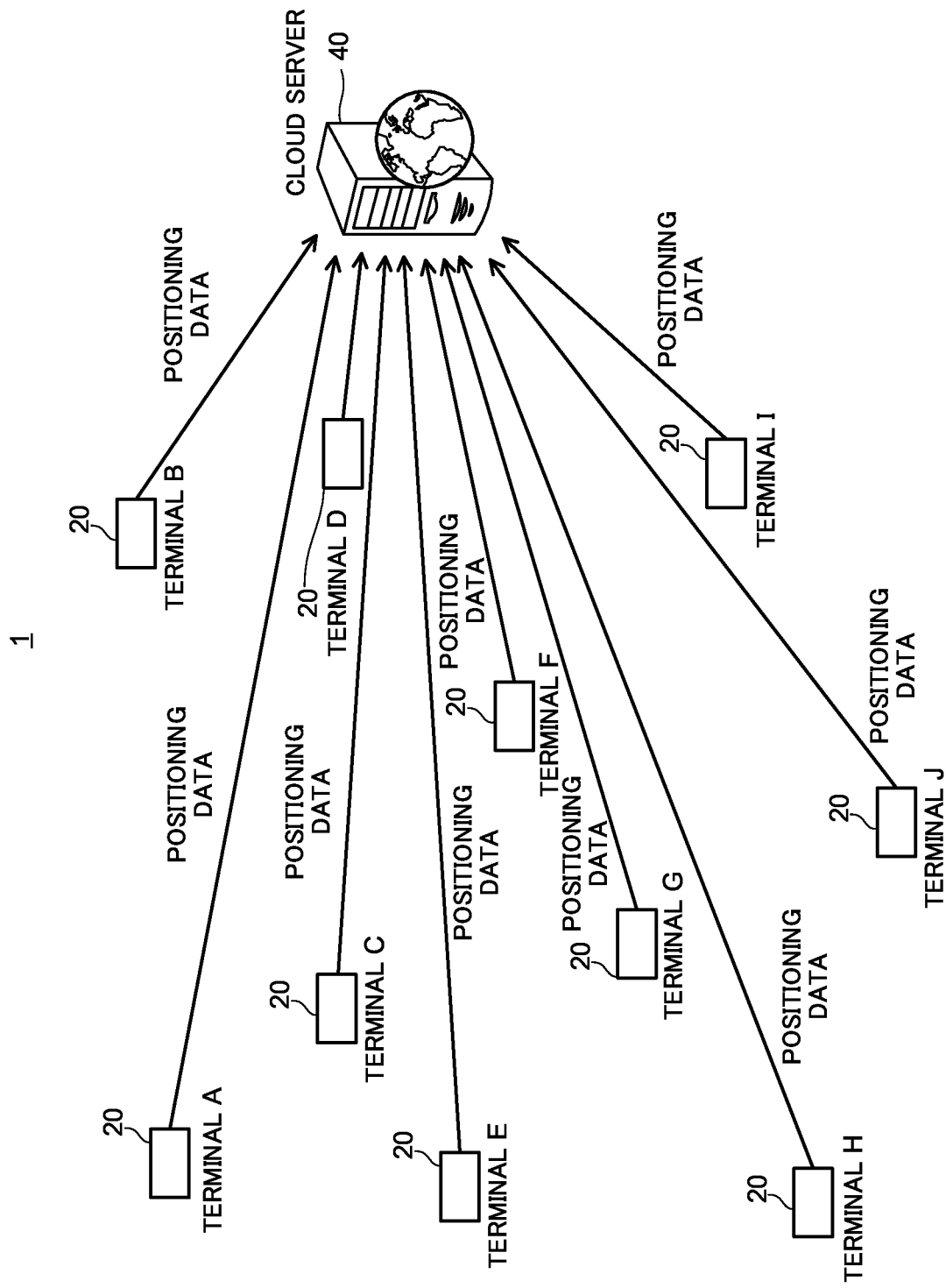
FIG. 1 illustrates a configuration of a satellite positioning system according to an embodiment of the present disclosure.

FIG. 1 illustrates an exemplary configuration of a satellite positioning system according to an embodiment. As illustrated in FIG. 1, satellite positioning system 1 includes positioning terminals 20 and cloud server 40.

Positioning terminal (hereinafter, may be abbreviated as "terminal") 20 receives radio waves (may be referred to as "satellite radio waves" or "positioning signals") transmitted from, for example, satellites (may be referred to as "positioning satellites"), which are not illustrated. Note that the "positioning terminal" may be referred to as a "client (terminal)", a "user (terminal)", or a "reception device".

The positioning satellites may be satellites of GNSS, e.g., satellites used for at least one of a global positioning system (GPS), GLONASS, Galileo, BeiDou, and a quasi-zenith satellite system (QZSS).

Positioning terminal 20 generates positioning data (may be referred to as "observation data") using satellite radio waves received from the positioning satellites. Positioning terminal 20 transmits the observation data to cloud server 40.

Note that a plurality of positioning terminals 20 may be present in satellite positioning system 1. FIG. 1 illustrates ten positioning terminals 20 labeled from A to J, as a non-limiting example. Positioning terminal 20 may illustratively include a dedicated terminal for positioning, a personal computer, a server computer, a smartphone, and a tablet that have a positioning function, for example. Positioning terminal 20 may also be installed in a moving object (e.g., a vehicle) for which the position (e.g., coordinates) is to be determined. Note that the "positioning terminal" may be simply referred to as a "reception device".

Cloud server 40 receives the positioning data generated by positioning terminal 20 by communicating with each of positioning terminals 20, for example. Cloud server 40 performs positioning for positioning terminals 20 based on the positioning data respectively received from positioning terminals 20.

In addition, cloud server 40 determines a satellite radio wave affected by multipath in terminal 20 as a target of RTK positioning (hereinafter, may be referred to as "RTK-positioning-target"), for example, based on the positioning data received from each of the plurality of terminals 20 located within certain set distance D1 with reference to the position of RTK-positioning-target terminal 20.

By way of non-limiting example, cloud server 40 compares, for each satellite, information (e.g., signal to noise ratios (SNRs)) indicating reception qualities of satellite radio waves in the same time period included in each of the positioning data.

Figure 2:
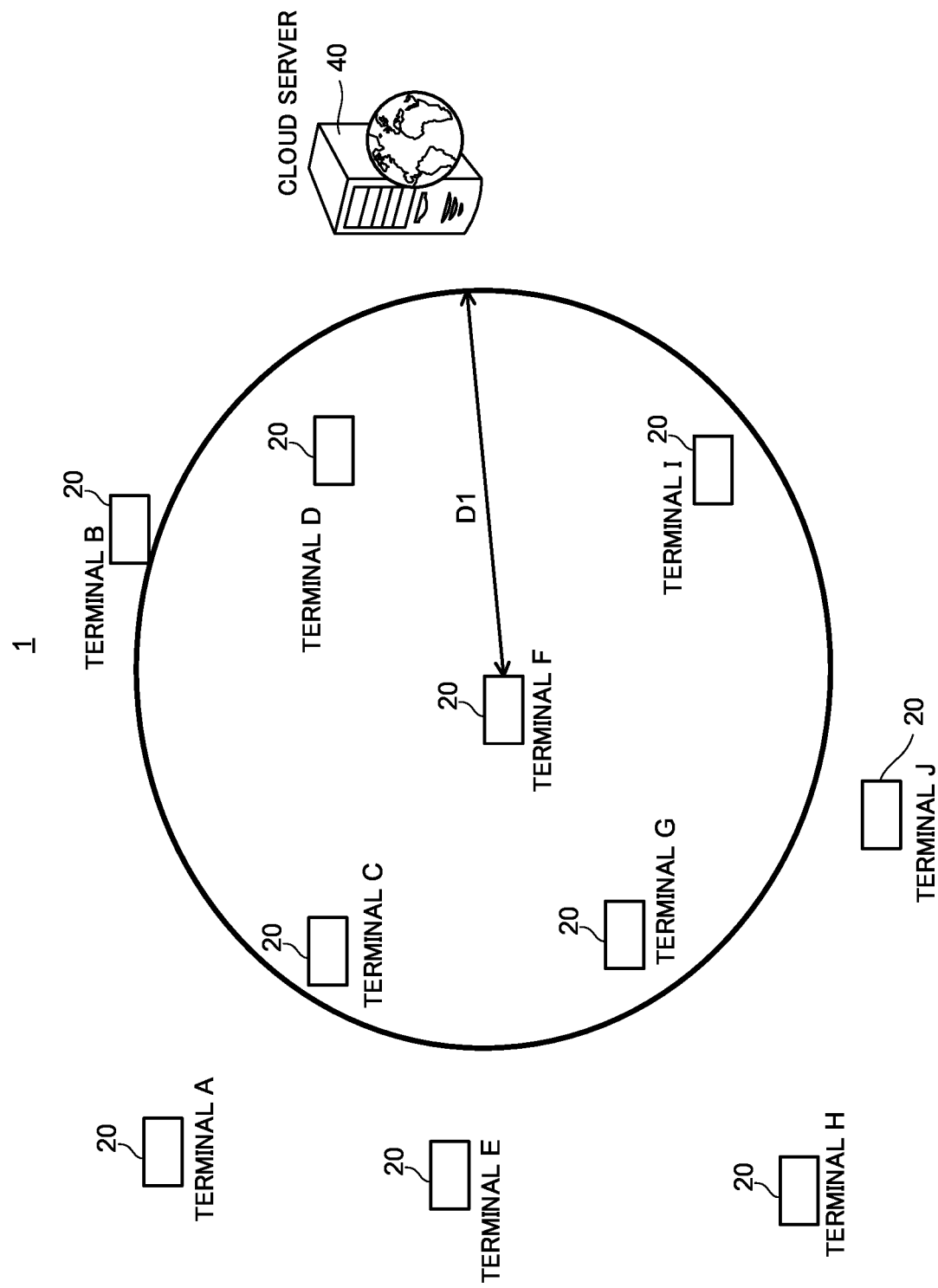
FIG. 2 is a diagram describing an exemplary general operation of the satellite positioning system illustrated in FIG. 1.
Figure 3:
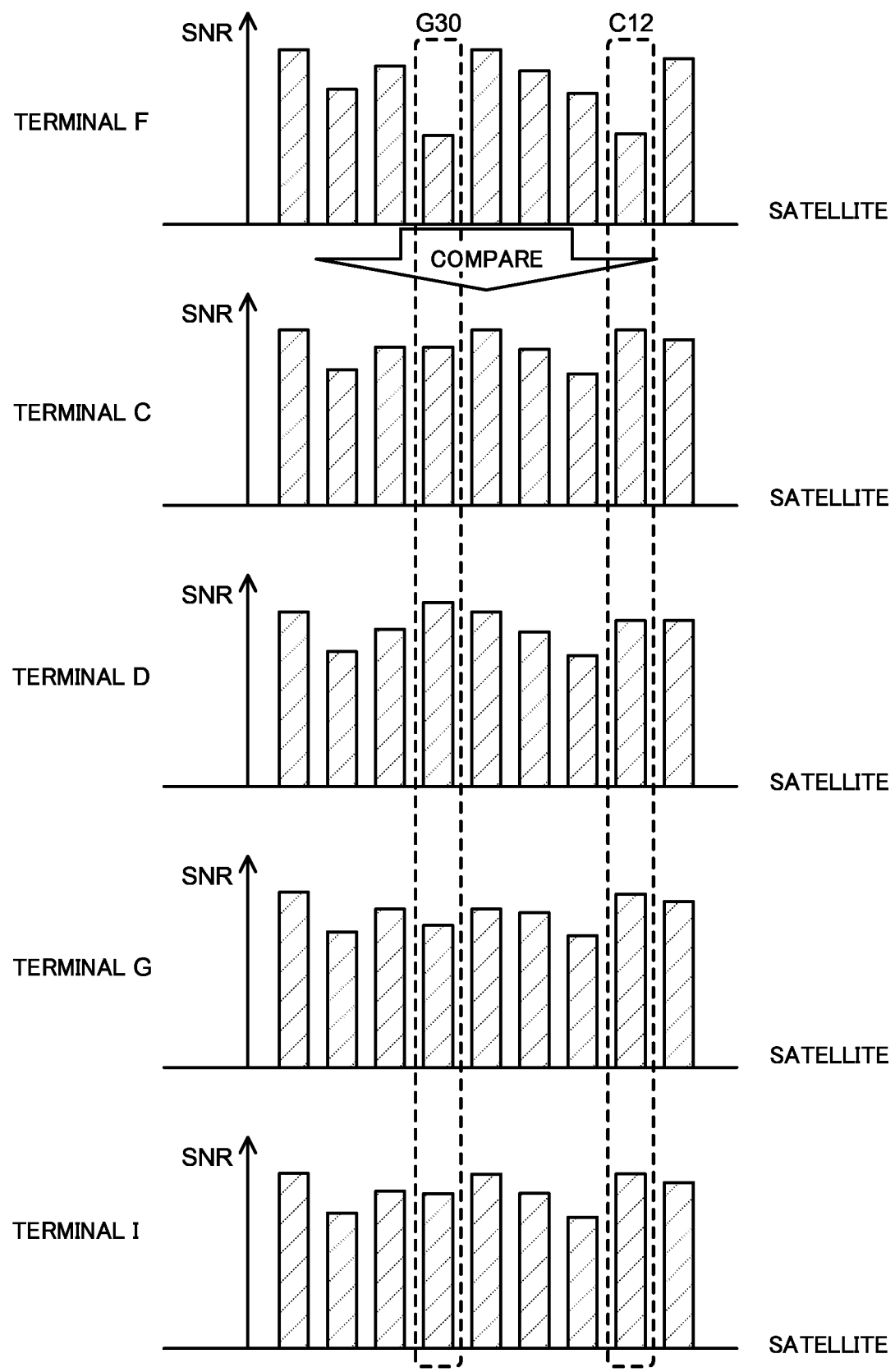
FIG. 3 is another diagram describing the exemplary general operation of the satellite positioning system illustrated in FIG. 1.

For example, when RTK-positioning-target terminal 20 is terminal F as illustrated in FIG. 2, four terminals C, D, G, and I besides terminal F are included in set distance D1 with reference to terminal F. As illustrated in FIG. 3, for example, cloud server 40 compares the SNRs of satellite radio waves received by terminal F in a certain time period with the SNRs of satellite radio waves received by other terminals C, D, G, and I located within set distance D1 in the same time period. Note that the SNR used in this comparison may be an averaged value in the above time period.

By way of non-limiting example, FIG. 3 illustrates a case where five terminals F, C, D, G and I each receive the radio waves from a total of nine satellites including two satellites indicated by G30 and C12.

For example, when the SNR for each satellite in terminal F is greatly deviated from the SNR for each satellite in terminals C, D, G and I as a result of the SNR comparison, the satellite radio wave with the deviated SNR can be determined to be affected by multipath.

In the example of FIG. 3, the SNRs of radio waves from the two satellites indicated by G30 and C12 are greatly lower in terminal F than the SNRs of other four terminals C, D, G and I, as indicated by broken line frames.

Cloud server 40 can thus determine that the radio waves (i.e., positioning signals) from the two satellites indicated by G30 and C12 are affected by multipath in terminal F.

Accordingly, cloud server 40 excludes the two satellites indicated by G30 and C12 from satellite candidates to be used for the RTK positioning for terminal F. This exclusion eliminates the effects of multipath on the RTK calculation for terminal F, thereby improving the RTK positioning accuracy for terminal F (i.e., the position estimation accuracy for terminal F).

Note that the position (e.g., the coordinates on the Earth) of terminal 20 obtained by the RTK positioning may be represented by, for example, three-dimensional coordinates of latitude, longitude and altitude, and may also be represented by two-dimensional coordinates of any two of latitude, longitude and altitude (e.g., latitude and longitude).

Further, a "reference station" is not illustrated in an embodiment. The reference station may or may not be fixed in position. An example of the latter includes providing functions of the reference station with the first moving object and providing functions of positioning terminal 20 with the second moving object that is carried by the first moving object.

In this case, the coordinates of the second moving object can be calculated by moving the first moving object to a place where the second moving object is used for an operation, and causing the first moving object to function as a reference station during the operation. For example, it is conceivable to carry a drone as the second moving object by a truck as the first moving object, and to perform the operation by the drone at the destination.

Further, at least one of the communication between cloud server 40 and positioning terminal 20 and the communication between cloud server 40 and a reference station may be time division multiplexing (TDM) communication or another multiplexing communication method. At least one of frequency division multiplexing (FDM), code division multiplexing (CDM), and orthogonal frequency division multiplexing (OFDM) may be applied to multiplexing in one-to-many communication.

Hereinafter, configuration examples of positioning terminal 20 and cloud server 40 according to an embodiment will be described by items. Note that, in the following description, " . . . er (or)" used for main components of positioning terminal 20 and cloud server 40 may be replaced with " . . . circuit (circuitry)", " . . . device", " . . . unit" or " . . . module", for example.

<Configuration of Positioning Terminal>

Figure 4:
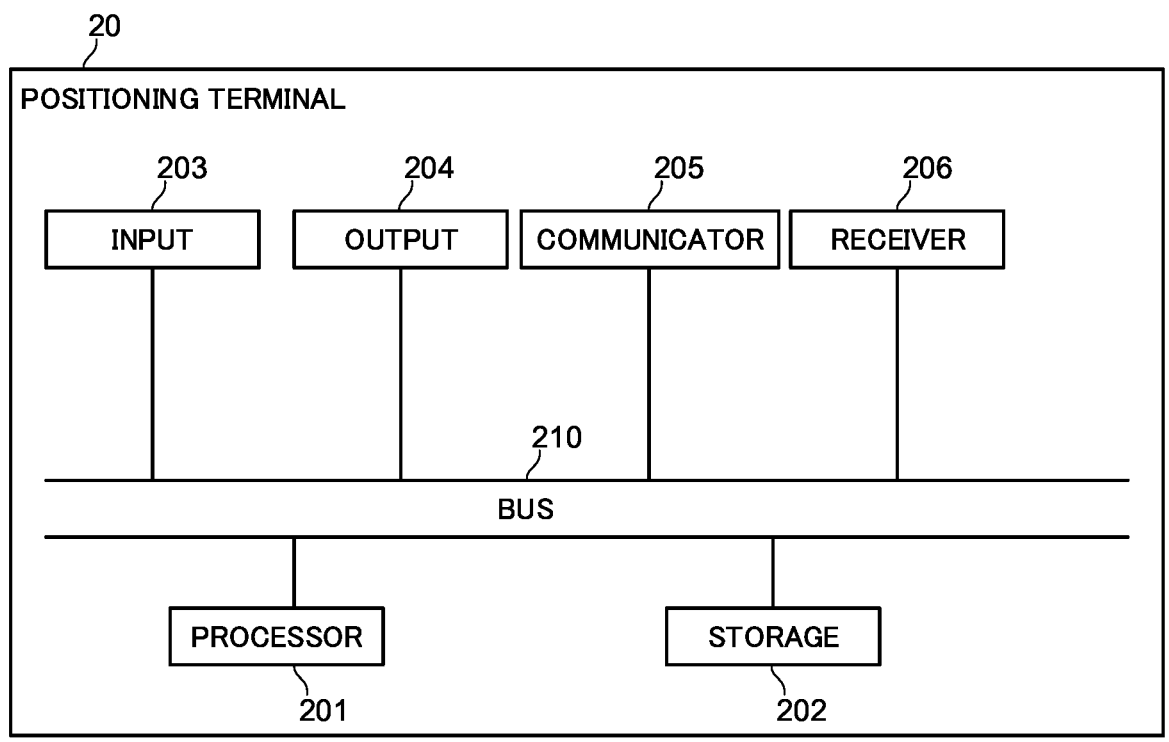
FIG. 4 is a block diagram illustrating an exemplary configuration of a positioning terminal illustrated in FIG. 1.

FIG. 4 is a block diagram illustrating an exemplary configuration of positioning terminal 20 according to an embodiment. As illustrated in FIG. 4, positioning terminal 20 illustratively includes processor 201, storage 202, input 203, output 204, communicator 205, receiver 206, and bus 210.

Processor 201 controls other components of positioning terminal 20 via bus 210. A Central Processing Unit (CPU) may be used for processor 201, for example. Processor 201 generates positioning data using received positioning signals by executing a predetermined program. The positioning data may include reception time of a satellite radio wave and information indicating the reception quality of the satellite radio wave (e.g., SNR).

Storage 202 acquires various information from other components and stores the information temporarily or permanently. Storage 202 is a generic term for so-called a primary storage device and a secondary storage device. A plurality of storages 202 may be physically placed. A DRAM, an HDD, or an SSD may be used for storage 202, for example.

Input 203 receives external information. The external information received by input 203 includes information on inputs from an operator of positioning terminal 20, for example. By way of example, input 203 may be configured with an input interface such as a keyboard.

Output 204 presents information outside. The information presented by output 204 includes information on positioning, for example. By way of example, output 204 may be configured with an output interface such as a display.

Communicator 205 communicates with an external device via a communication path. A target (communication target) device communicated with communicator 205 includes cloud server 40. By way of example, communicator 205 may be configured with a communication interface capable of communicating with a communication network such as a wireless LAN.

Receiver 206 receives a positioning signal from a satellite, and outputs the positioning signal to processor 201 via bus 210.

Note that the configuration of positioning terminal 20 described above is an example. Some of the components of positioning terminal 20 may be integrated. Some of the components of positioning terminal 20 may be divided into a plurality of components. Some of the components of positioning terminal 20 may be omitted. Another component may be added to positioning terminal 20.

<Configuration of Cloud Server>

Figure 5:
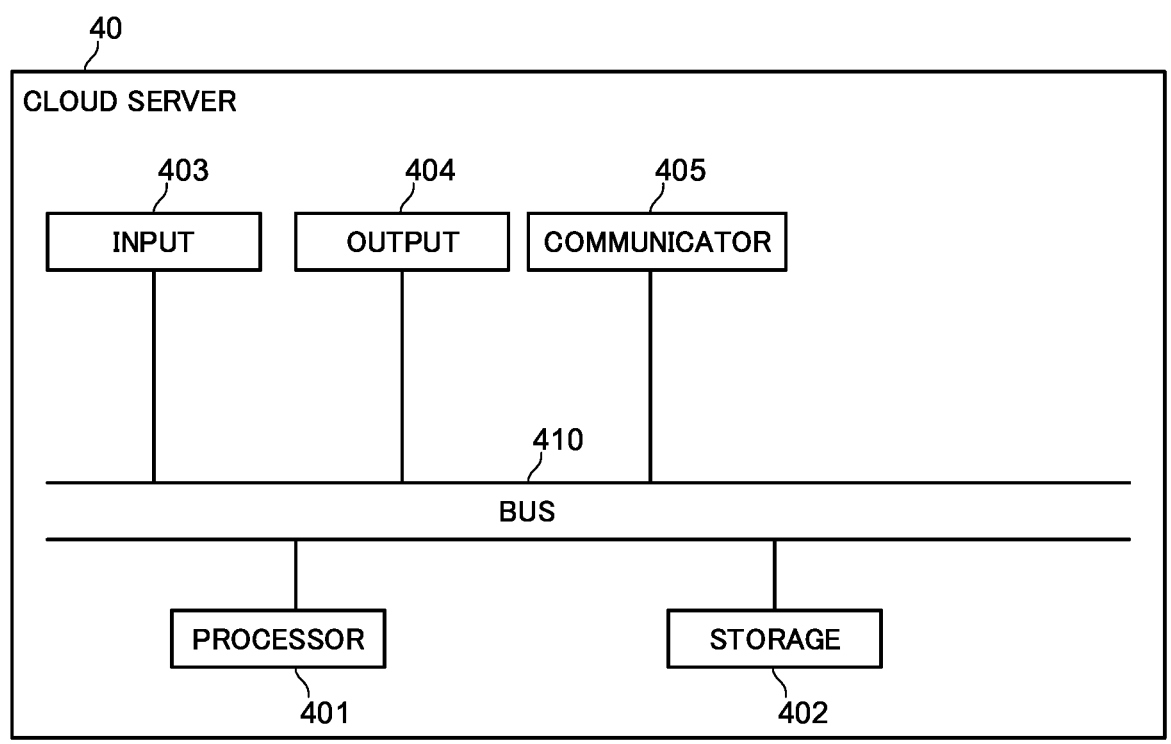
FIG. 5 is a diagram illustrating an exemplary configuration of a cloud server illustrated in FIG. 1.

FIG. 5 is a block diagram illustrating an exemplary configuration of cloud server 40 according to an embodiment. As illustrated in FIG. 5, cloud server 40 includes, for example, processor 401, storage 402, input 403, output 404, communicator 405, and bus 410.

Processor 401 controls other components of cloud server 40 via bus 410. A CPU may be used for processor 401, for example. Processor 401 estimates the position of positioning terminal 20 based on, for example, the positioning data received from positioning terminal 20.

Although the position estimated from the positioning data (hereinafter, also referred to as the "estimated position") is not an accurate position, it is sufficient to obtain an approximate position as pre-processing for determining a satellite radio wave affected by multipath.

Processor 401 performs multipath elimination processing as described in FIGS. 2 and 3 based on the estimated position of each positioning terminal 20. The multipath elimination processing may include, as described above, the SNR comparison processing for each satellite and the satellite exclusion processing based on the result of the SNR comparison.

Storage 402 acquires various information from other components and stores the information temporarily or permanently. Storage 402 may store information on the multipath elimination processing, for example. Storage 402 is a generic term for so-called a primary storage device and a secondary storage device. A plurality of storages 402 may be physically placed. A DRAM, an HDD, or an SSD may be used for storage 402, for example.

Input 403 receives external information. The external information received by input 403 includes information on inputs from an operator of cloud server 40, for example. By way of example, input 403 may be configured with an input interface such as a keyboard.

Output 404 presents information outside. The information presented by output 404 includes information on positioning, for example. By way of example, output 404 may be configured with an output interface such as a display.

Communicator 405 communicates with an external device via a communication path. A target (communication target) device communicated with communicator 405 includes positioning terminal 20. By way of example, communicator 405 may be configured with a communication interface capable of communicating with a communication network such as a cellular communication network.

<Positioning Data>

Next, positioning data will be described. The positioning data illustratively includes pseudo-distance information, carrier phase information, and Doppler frequency information.

The pseudo-distance information is information on the distance between a satellite and a reception device (e.g., positioning terminal 20 or a reference station). The reception device can calculate the distance from the satellite by analyzing a positioning signal. For example, the reception device determines the arrival time of the positioning signal based on the following information.

1. Difference between a code pattern carried by the positioning signal and a code pattern (a replica) generated by the reception device
2. Signal generation time of the satellite and the signal reception time of the reception device Note that the signal generation time of the satellite is included in a message (NAVDATA) of the positioning signal.

The reception device determines the pseudo distance between the satellite and the reception device by multiplying the arrival time of the positioning signal by the speed of light. The pseudo distance includes an error caused by the difference between a clock of the satellite and a clock of the reception device, for example. To reduce the error, the pseudo-distance information is generated for four or more satellites.

The carrier phase information is a phase of the positioning signal received by the reception device. The positioning signal is a predetermined sine wave. The reception device can calculate the phase of the positioning signal by analyzing the received positioning signal.

The Doppler frequency information is information on a relative speed between the satellite and the reception device. The reception device can generate the Doppler frequency information by analyzing the positioning signal.

<RTK Calculation>

Next, RTK calculation will be described. The RTK calculation is a calculation executing an RTK method that is a type of interference positioning.

The RTK method is a positioning method of performing positioning for a predetermined point using a carrier phase integrated value of a positioning signal transmitted by a satellite. The carrier phase integrated value is represented by the sum of 1) the number of waves of the positioning signal from the satellite to the predetermined point and 2) the phase of the same.

Since the frequency (and the wavelength) of the positioning signal is already known, the determination of the carrier phase integral value allows to determine the distance between the satellite and the predetermined point. The number of waves of the positioning signal is unknown, and is thus referred to as integer ambiguity or integer value bias.

The RTK method includes noise removal and estimation (or determination) of the integer ambiguity.

In the RTK method, noise can be removed by calculating a difference called a double difference, for example. The double difference is a difference between values calculated in two reception devices (e.g., a reference station and positioning terminal 20), and the value is a difference between the carrier phase integral values for two satellites in a single reception device (i.e., a single difference). Four or more satellites are used in the positioning by the RTK method, so that the double difference is calculated for the number of combinations of four or more satellites. The calculation of the double difference uses, for example, positioning data generated by the reference station and positioning data generated by positioning terminal 20.

Further, in the RTK method, various methods are applied to estimate the integer ambiguity. For example, the integer ambiguity is estimated by performing the following procedure: 1) estimation of a float solution by a least-squares method, and 2) verification of a fix solution based on the float solution.

The estimation of the float solution by the least-squares method is carried out by preparing a simultaneous equation with the combinations of the double difference generated for each time unit, and solving the prepared simultaneous equation by the least-squares method. This calculation uses, for example, positioning data generated by the reference station, positioning data generated by positioning terminal 20, and known coordinates of the reference station. A real number estimate of the integer ambiguity estimated in this manner is referred to as the float solution (estimation solution).

The float solution determined as described above is a real number, whereas a true value of the integer ambiguity is an integer. The float solution is thus converted to an integer value by "rounding". Here, a plurality of candidates can be considered as the combinations of rounding the float solution.

The correct integer value is verified among the plurality of candidates. A likely solution as the integer value bias by the verification is referred to as the fix solution (precise positioning solution). In an embodiment, quality check is performed using an Ambiguity Ratio (AR) value obtained by the RTK calculation, and the correct integer value is verified based on the result of the quality check. The positioning data generated by the reference station may be used in order to efficiently filter the candidates for the integer value.

<Function of Cloud Server for Determining Coordinates of Positioning Terminal>

Next, a description will be given of a function of processor 401 of cloud server 40 for determining the position (the coordinates on the Earth) of positioning terminal 20.

Processor 401 performs interference positioning by the RTK method (the RTK calculation) using, for example, positioning data in positioning terminal 20 and positioning data in a reference station, and calculates a positioning solution (a fix solution or a float solution). The positioning solution obtained by the RTK calculation may be referred to as an "RTK positioning solution".

Processor 401 performs quality check using an AR value obtained by the RTK calculation. When the AR value is equal to or greater than a predetermined threshold (e.g., 3.0), processor 401 determines that a correct fix solution has been obtained, and outputs the fix solution. When the AR value is less than the predetermined threshold, processor 401 determines that a correct positioning solution has not been obtained, and outputs a float solution.

Processor 401 then determines the RTK positioning solution as the position (the coordinates on the Earth) of positioning terminal 20.

<Operation of Satellite Positioning System>

Next, an exemplary operation of satellite positioning system 1 according to an embodiment will be described with reference to FIGS. 6 to 17.

(Overall Operation)

Figure 6:
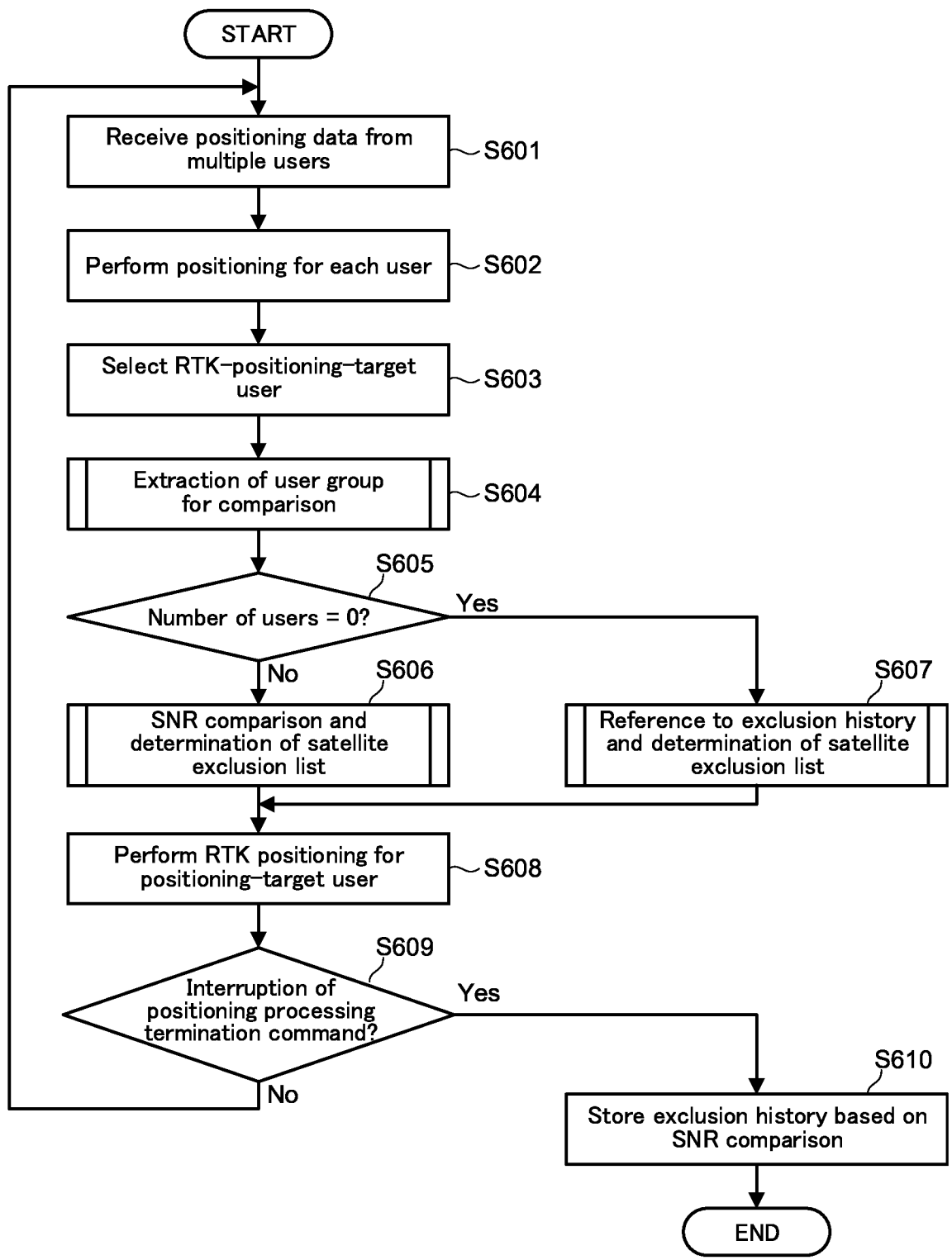
FIG. 6 is a flowchart describing an exemplary general operation focusing on the cloud server in the satellite positioning system illustrated in FIG. 1.

FIG. 6 is a flowchart illustrating an exemplary general operation focusing on cloud server 40 of satellite positioning system 1 according to an embodiment.

As illustrated in FIG. 6, cloud server 40 receives positioning data from a plurality of positioning terminals 20 (hereinafter, also referred to as "users 20") (S601).

Cloud server 40 performs positioning (estimation) for the position of each user 20 based on the received positioning data (S602).

Cloud server 40 then selects user 20 to be a target of RTK positioning among the plurality of users 20 (S603), and selects (or extracts) a group of users 20 for SNR comparison based on selected user (RTK-positioning-target user) 20 (S604). An exemplary processing of extracting the group of users 20 will be described later with reference to FIGS. 7 to 9.

Cloud server 40 determines whether the number of users 20 in the group that can be extracted in S604 is 0 (S605).

When the number of users 20 in the group that can be extracted is not 0 (No in S605), cloud server 40 compares the SNRs of satellite radio waves in users 20 for each satellite based on the positioning data received from users 20, and determines a satellite exclusion list (S606). An exemplary processing of determining the satellite exclusion list will be described later with reference to FIGS. 12 and 13.

When the number of users 20 in the group that can be extracted is 0 (Yes in S605), in contrast, cloud server 40 refers to an exclusion history and determines the satellite exclusion list (S607). An exemplary processing of determining the satellite exclusion list based on the exclusion history will be described later with reference to FIGS. 14 to 17.

According to the determination of the satellite exclusion list in S606 or S607, cloud server 40 performs positioning by the RTK calculation for the position of RTK-positioning-target user 20 selected in S603, using positioning data corresponding to the remaining satellites that are not excluded (S608). Satellite radio waves affected by multipath have been excluded, thereby improving the positioning accuracy.

Subsequently, cloud server 40 determines whether a positioning processing termination command interrupts (S609), and repeats the processing from S601 when there is no interruption of the positioning processing termination command (No in S609).

When there is an interruption of the positioning processing termination command (Yes in S609), cloud server 40 stores information on the RTK positioning performed in S608 as the "exclusion history" in, for example, storage 402 (S610). The "exclusion history" may thus be stored in storage 402 in chronological order for each RTK positioning.

By way of non-limiting example, the "exclusion history" may include position information of RTK-positioning-target user 20 subjected to the RTK positioning, position information of the excluded satellites (e.g., elevation angles and azimuth angles), and information of the RTK positioning time (see, for example, FIG. 16 to be described later).

This "exclusion history" is used, for example, in the processing of determining the satellite exclusion list (S607) when no terminal 20 is extracted for the SNR comparison in S605.

(User Group Extraction Processing)

Next, a description will be given of an exemplary processing of extracting the group of users 20 (S604) described above, with reference to FIGS. 7 to 9.

Figure 7:
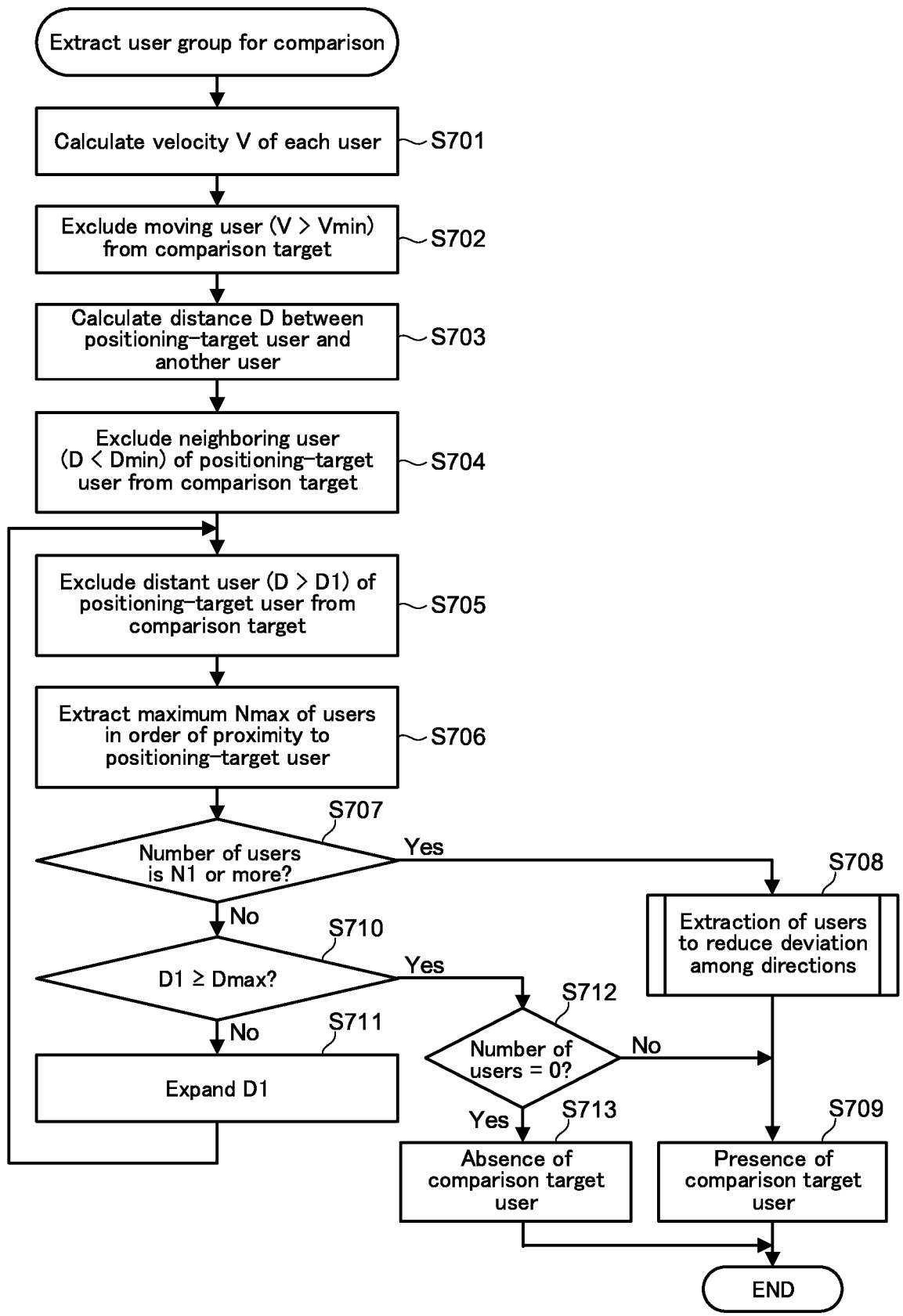
FIG. 7 is a flowchart describing an exemplary processing of extracting a group of the positioning terminals illustrated in FIG. 6 (S604)

FIG. 7 is a flowchart describing an exemplary processing of extracting the group of users 20 (S604). As illustrated in FIG. 7, cloud server 40 calculates velocity V of each user 20 based on the positioning data received from each user 20 (S701). Velocity V may be calculated as an average value for each time unit.

Cloud server 40 then compares velocity V of each user 20 with threshold Vmin, determines user 20 with V>Vmin as a moving object, and excludes the user 20 determined as the moving object from the SNR comparison targets (S702).

The reason for the exclusion is as follows. For user 20 moving at velocity V exceeding threshold Vmin, the received satellite signal is affected by multipath with changes in a surrounding environment, such as buildings on the ground, due to the movement, and thus the SNR fluctuates greatly. In other words, the exclusion of the moving object improves the multipath determination accuracy by the SNR comparison, thereby accordingly improving the RTK positioning accuracy.

Figure 8:
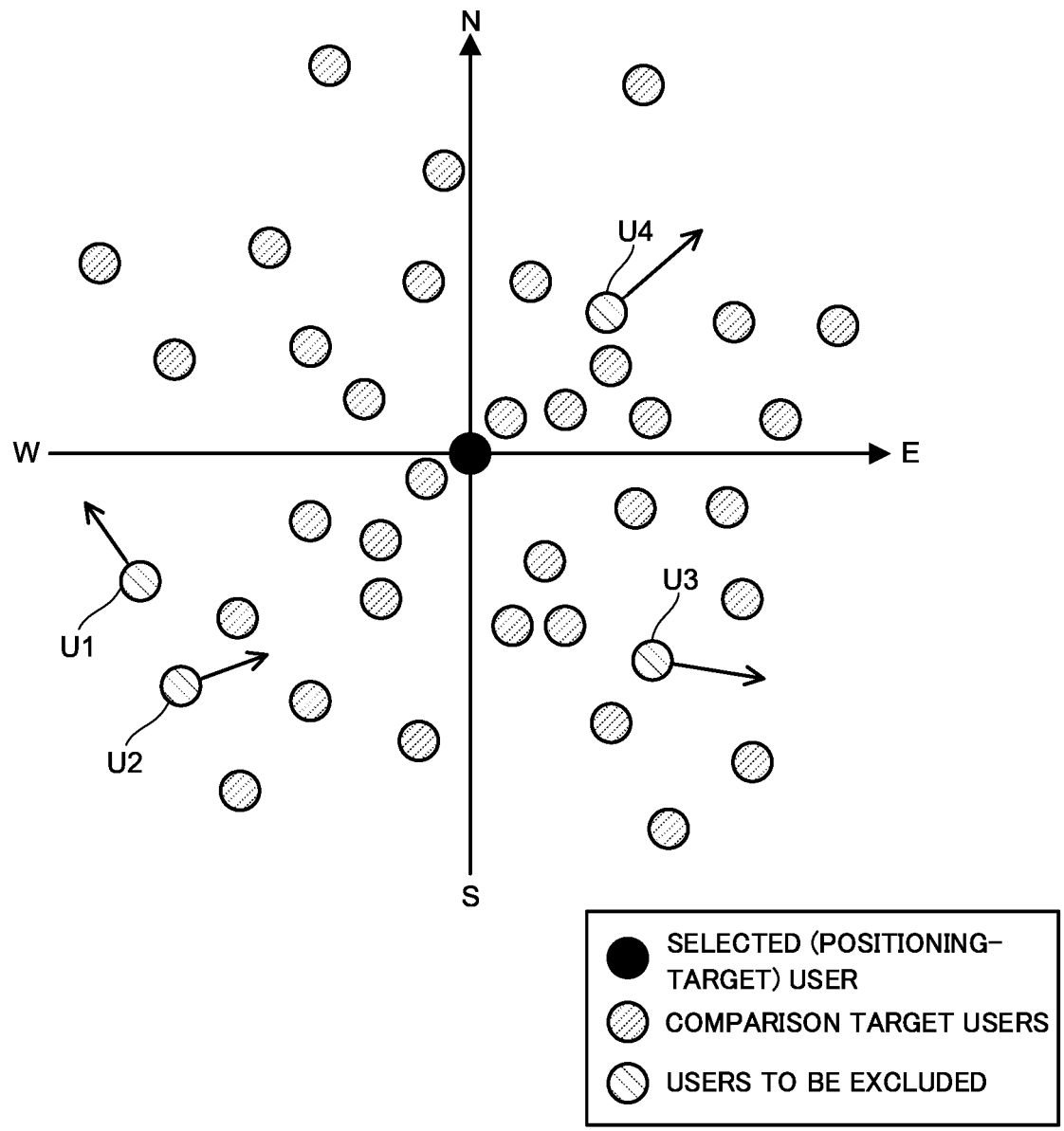
FIG. 8 is a diagram visually illustrating an exemplary processing of excluding the positioning terminals illustrated in FIG. 7 (S702)

By way of non-limiting example, users U1 to U4 illustrated as moving objects with arrows satisfy V>Vmin, and are thus excluded from the SNR comparison targets, as illustrated in FIG. 8.

In addition, cloud server 40 calculates distances D between user 20 selected as the RTK positioning target and other users 20 based on the positions estimated in S602 (S703).

Cloud server 40 then compares distances D with threshold Dmin (e.g., 20 m), and excludes users 20 satisfying D<Dmin from the SNR comparison targets (S704).

Users 20 that are too close to RTK-positioning-target user 20 are possibly affected by the same multipath as the multipath affecting RTK-positioning-target user 20, and the SNR is unlikely be different from the SNR of RTK-positioning-target user 20. This is the reason for the exclusion. The exclusion of such users 20 facilitates improving the positioning accuracy.

Further, cloud server 40 compares distances D with threshold D1 (wherein, Dmax≥D1>Dmin), and excludes users 20 satisfying D>D1 from the SNR comparison targets (S705).

Note that D1 is an example of the first set distance, and Dmin is an example of the second set distance. Dmax represents the maximum value (maximum distance) of distances D from RTK-positioning-target user 20 to users 20 to be included in the SNR comparison targets.

The reason for the exclusion is as follows. The change in the SNRs of the satellite radio waves observed in users 20 located far from RTK-positioning-target user 20 is considered to be less correlated with the SNRs of RTK-positioning-target user 20. The exclusion of less-correlated users 20 from the SNR comparison targets gives little effect on the RTK positioning accuracy, and the effect of reducing computational complexity is considered to be greater.

Figure 9:
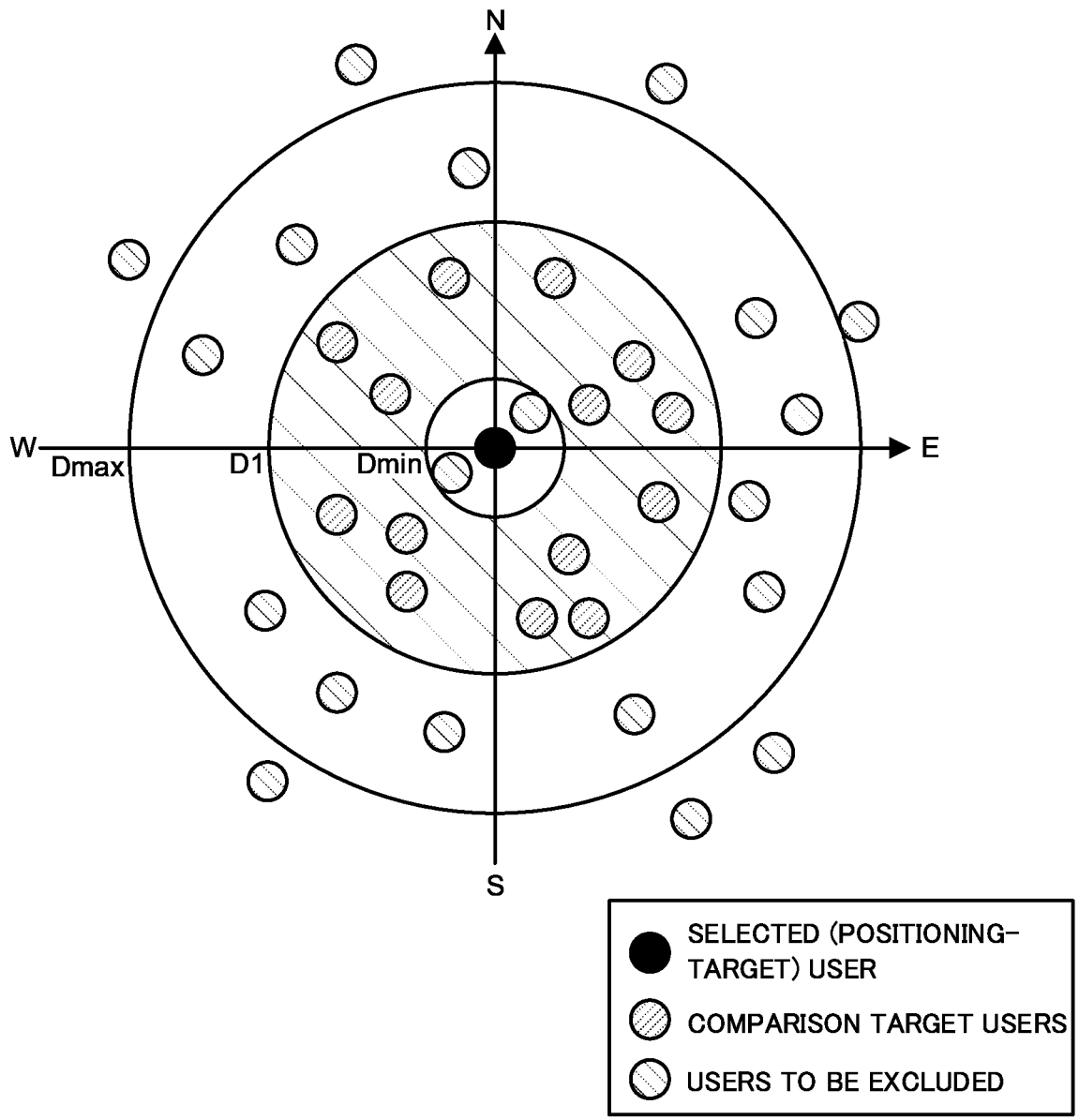
FIG. 9 is a diagram visually illustrating an exemplary processing of excluding the positioning terminals illustrated in FIG. 7 (S705)

FIG. 9 illustrates a non-limiting example of the user exclusion processing based on distance D indicated in S704 and S705. In FIG. 9, among the plurality of users 20, users 20 located inside a circle with radius Dmin centered on RTK-positioning-target terminal 20 and users 20 located outside a circle with radius D1 are excluded from the SNR comparison targets. Accordingly, users 20 located in a belt-shaped or toroidal area defined by the circle with radius Dmin and the circle with radius D1 are selected as the SNR comparison targets.

Note that the user exclusion processing described above (S702, S704 and S705) may be regarded as processing of selecting (or extracting) users 20 not satisfying the exclusion condition, or may be regarded as processing of filtering candidates of users 20 to be included in the SNR comparison targets.

Such user selection processing or user filtering processing can reduce processing load (e.g., processing load relating to multipath elimination) thereafter in cloud server 40. Note that some or all of the user exclusion processing described above (S702, S704 and S705) may be optional.

In addition, the user exclusion processing based on velocity V (S701 and S702) and the user exclusion processing based on distance D (S703 to S705) may be performed in reverse order or in parallel. Further, in the user exclusion processing based on distance D, exclusion processing S704 for the neighboring users and exclusion processing S705 for the distant users may be performed in reverse order or in parallel.

After the user exclusion processing based on velocity V and distance D, cloud server 40 selects (or extracts), as illustrated in FIG. 7, maximum Nmax of users 20 from a group of users 20 that are not excluded, for example, in the order from user 20 with distance D closest to RTK-positioning-target user 20 (S706).

Cloud server 40 then determines whether the number of users selected in S706 is equal to or greater than threshold N1 (S707). When the number of selected users is equal to or greater than threshold N1 (Yes in S707), cloud server 40 further selects (or extracts) users 20, for example, so as to level the number of selected users among a plurality of directions (in other words, so as to reduce deviation among directions) (S708). The user selection processing in S708 is also referred to as "user number optimization processing among directions" in the following for convenience. An example of the "user number optimization processing among directions" will be described later with reference to FIGS. 10 and 11.

After the user number optimization processing among directions (S708), cloud server 40 determines that there is user 20 as the SNR comparison target (that the number of users is not 0) (S709), and terminates the processing of extracting the group of users (S604).

When the number of users is less than threshold N1 in S707 of FIG. 7 (No in S707), cloud server 40 determines, for example, whether D1≥Dmax (S710). When D1 is less than Dmax (No in S710), cloud server 40 increases D1 (S711), and repeats the processing from S705.

Herein, increasing D1 corresponds to expanding the circle with radius D1 illustrated in FIG. 9, for example. That is, when an insufficient number of users 20 are extracted for the SNR comparison, cloud server 40 increases the number of candidate users for the SNR comparison targets by expanding the circle with radius D1.

When D1≥Dmax (Yes in S710), D1 cannot be increased any more, and thus it is determined whether the number of users selected at that time is 0 (S712).

When the number of users is not 0 (No in S712), cloud server 40 determines that there is user 20 as the SNR comparison target (S709), and terminates the processing of extracting the group of users (S604).

When the number of users is 0 (Yes in S712), cloud server 40 determines that there is no user 20 as the SNR comparison target (S713), and terminates the processing of extracting the group of users (S604).

(User Number Optimization Processing Among Directions)

Next, a description will be given of an example of the user number optimization processing among directions illustrated in S708 of FIG. 7, with reference to FIGS. 10 and 11.

Figure 10:
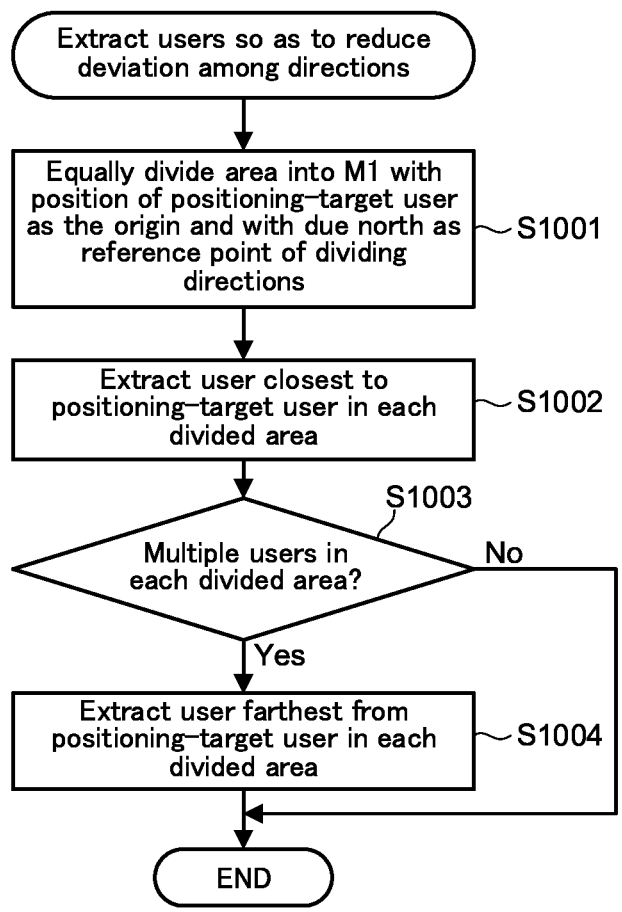
FIG. 10 is a flowchart describing an exemplary user number optimization processing among directions illustrated in FIG. 7 (S708)

FIG. 10 is a flowchart describing an example of the user number optimization processing among directions illustrated in S708 of FIG. 7. As illustrated in FIG. 10, cloud server 40 divides a circular area having radius D1 with reference to (with the origin of) user 20 selected as the RTK positioning target in S603 of FIG. 6, into a plurality (M1) of directions (S1001).

Figure 11:
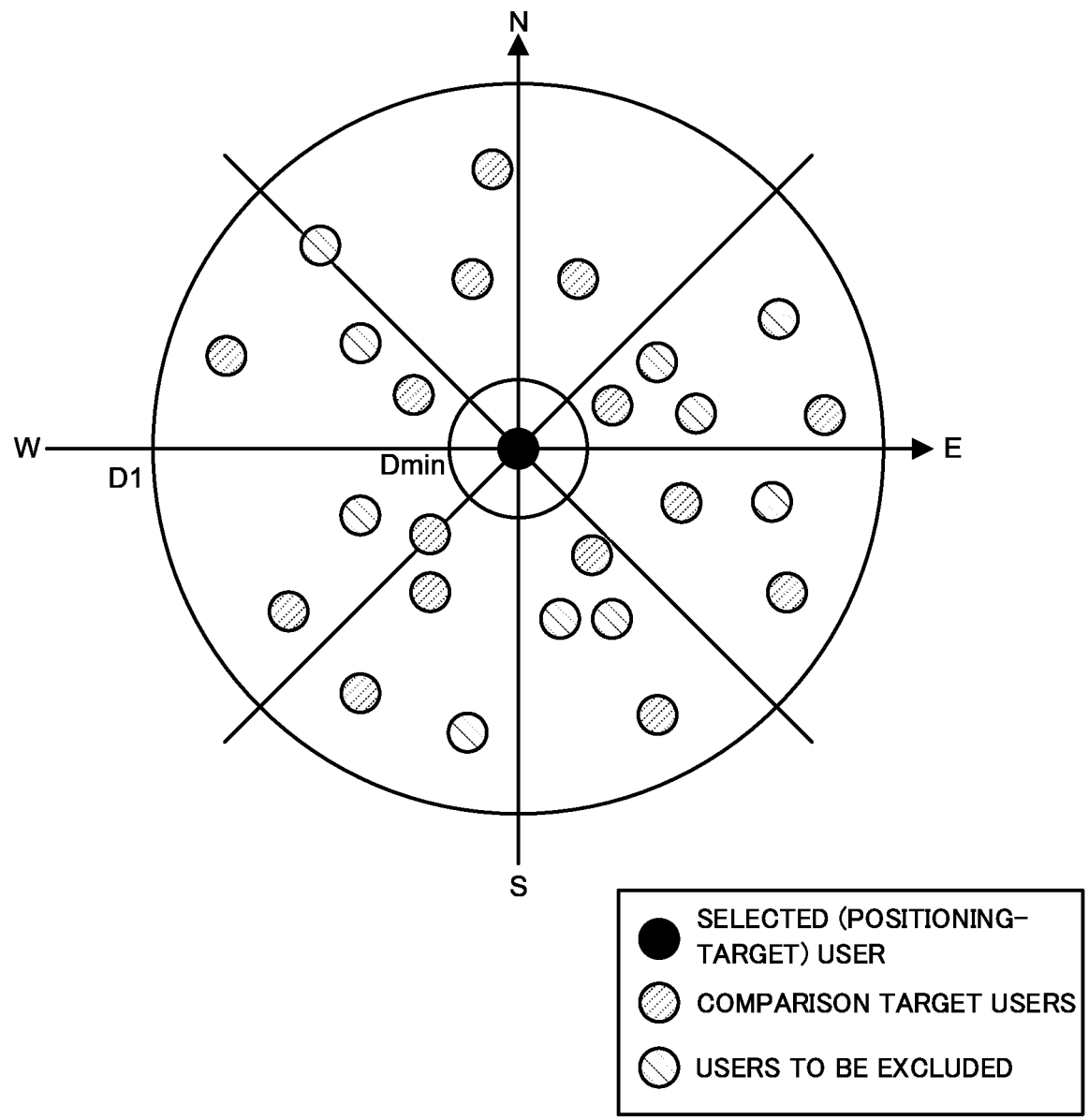
FIG. 11 is a diagram visually illustrating an exemplary processing of extracting a positioning terminal illustrated in FIG. 10 (S1002)

As illustrated in FIG. 11 for example, cloud server 40 sets M=8, and divides the circular area with radius D1 into eight areas. Note that FIG. 11 illustrates an example of equally dividing the circular area with radius D1.

Cloud server 40 then selects (or extracts) user 20 closest in distance to RTK-positioning-target user 20 in each of the number M of divided areas (S1002).

Subsequently, cloud server 40 determines whether a plurality of users 20 are present in each of the divided areas (S1003).

When a plurality of users 20 are present in each of the divided areas (Yes in S1003), cloud server 40 selects (or extracts) user 20 farthest in distance from RTK-positioning-target user 20 in each of the divided areas (S1004), and terminates the processing.

When a plurality of users 20 are not present in each of the divided areas (No in S1003), cloud server 40 terminates the processing without performing S1004.

The above-described user number optimization processing among directions allows to select (or extract) users 20 as the SNR comparison targets so that the deviation among the divided areas is reduced, as illustrated in FIG. 11 for example. In other words, users 20 that are not selected in S1002 and S1003 are excluded from the candidate users 20 for the SNR comparison.

(Processing of Determining Satellite Exclusion List Based on SNR Comparison)

Next, a description will be given of the processing of determining the satellite exclusion list illustrated in S606 of FIG. 6, with reference to FIGS. 12 and 13.

Figure 12:
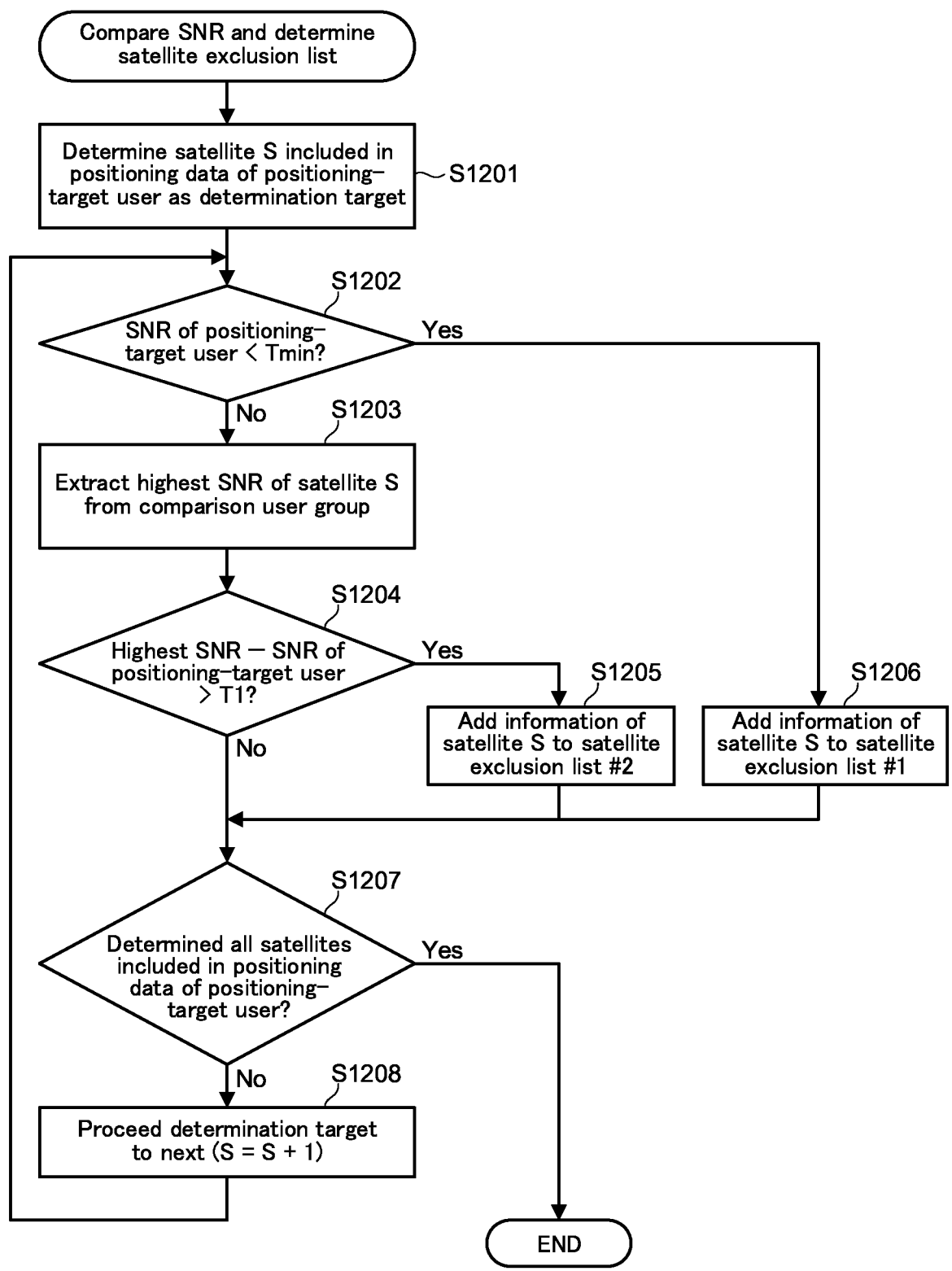
FIG. 12 is a flowchart describing an exemplary processing of determining a satellite exclusion list illustrated in FIG. 6 (S606)

FIG. 12 is a flowchart describing an exemplary processing of determining the satellite exclusion list illustrated in S606 of FIG. 6. As illustrated in FIG. 12, cloud server 40 determines satellite S to be determined by the SNR comparison based on satellite information included in positioning data received from RTK-positioning-target user 20 (S1201).

Cloud server 40 then determines whether the SNR of a radio wave from satellite S observed in RTK-positioning-target user 20 is lower than threshold Tmin, based on the positioning data received from the user 20 (S1202).

When the SNR of the radio wave from satellite S is lower than threshold Tmin (Yes in S1202), cloud server 40 determines before multipath determination that the SNR is too low, and registers (adds) satellite S in satellite exclusion list #1 (S1206).

Meanwhile, when the SNR of the radio wave from satellite S is equal to or higher than threshold Tmin (No in S1202), cloud server 40 selects (or extracts) the highest SNR from the SNRs of the group of users selected as the SNR comparison targets in S604 of FIG. 6 (S701 to S712 of FIG. 7) (S1203).

Subsequently, cloud server 40 determines whether a difference between the highest SNR and the SNR of RTK-positioning-target user 20 is greater than threshold T1 (S1204).

When the difference between the SNRs is greater than threshold T1 (Yes in S1204), cloud server 40 determines that the radio wave of satellite S is affected by multipath in RTK-positioning-target user 20, and registers satellite S in satellite exclusion list #2 (S1205).

When the difference between the SNRs is equal to or smaller than threshold T1 (No in S1204), cloud server 40 determines whether the exclusion determination by the SNR comparison has been performed on radio waves of all satellites observed in RTK-positioning-target user 20 (S1207). Note that the satellites to be subjected to the exclusion determination by the SNR comparison are identified based on the satellite information included in the positioning data from RTK-positioning-target user 20.

When determining that the exclusion determination has been performed on all satellites (Yes in S1207), cloud server 40 may terminate the processing of determining the satellite exclusion lists.

When determining that there is a satellite yet to be subjected to the exclusion determination (No in S1207), cloud server 40 configures another satellite as the satellite subjected to the exclusion determination (S=S+1) (S1208), and repeats the processing from S1202.

Figure 13:
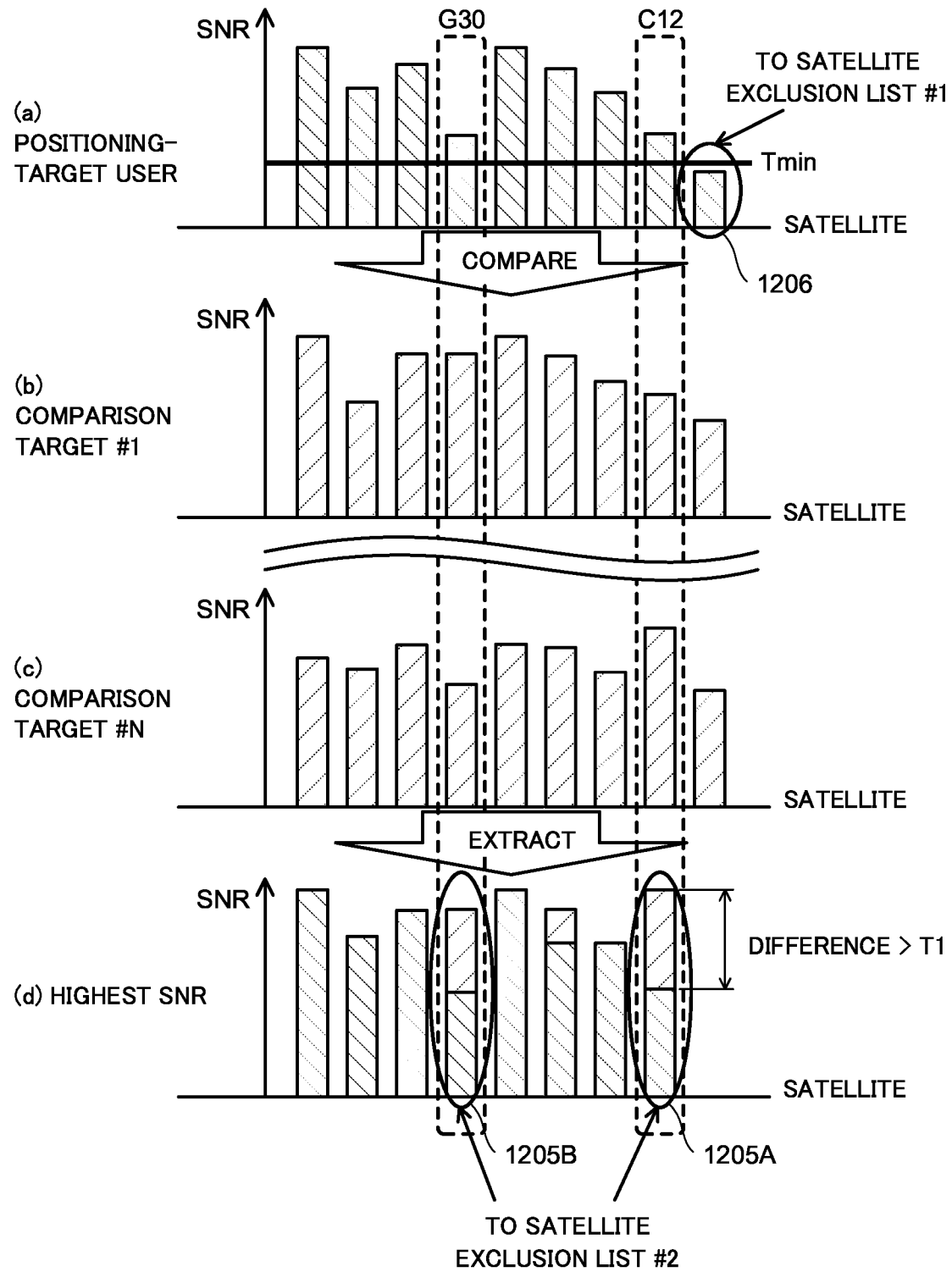
FIG. 13 is a diagram visually illustrating an exemplary SNR comparison (determination) processing illustrated in FIG. 12 (S1204)

FIG. 13 visually illustrates a non-limiting example of the exclusion determination processing described above. The graph of (a) in FIG. 13 illustrates SNRs of radio waves from nine satellites observed in RTK-positioning-target user 20. The graphs of (b) and (c) in FIG. 13 illustrate SNRs of radio waves from the nine satellites observed in other users 20 (comparison targets #1 to #N) selected as SNR comparison targets. The graph of (d) in FIG. 13 superimposes the SNR for each satellite in RTK-positioning-target user 20 on the highest SNR for each satellite in comparison targets #1 to #N.

The SNR surrounded by frame 1206 in (a) of FIG. 13 is lower than threshold Tmin, and thus determined to be YES in S1202 of FIG. 12. Accordingly, a satellite transmitted a radio wave with the SNR surrounded by frame 1206 is registered in satellite exclusion list #1 in S1206 of FIG. 12.

In addition, for each of satellites C12 and G30 as indicated by broken-line frames in FIG. 13, when a difference between SNRs exceeding threshold T1 (see frames 1205A and 1205B) is detected by the SNR comparison for each satellite, it is determined to be Yes in S1204 of FIG. 12. Two satellites C12 and G30 are registered accordingly in satellite exclusion list #2 in S1205 of FIG. 12.

(Processing of Determining Satellite Exclusion List Based on Exclusion History)

Next, a description will be given of an exemplary processing of determining the satellite exclusion list (S607 of FIG. 6) in a case where no terminal 20 is extracted as an SNR comparison target (in a case where it is determined to be YES in S605 of FIG. 6), with reference to FIGS. 14 to 17.

Figure 14:
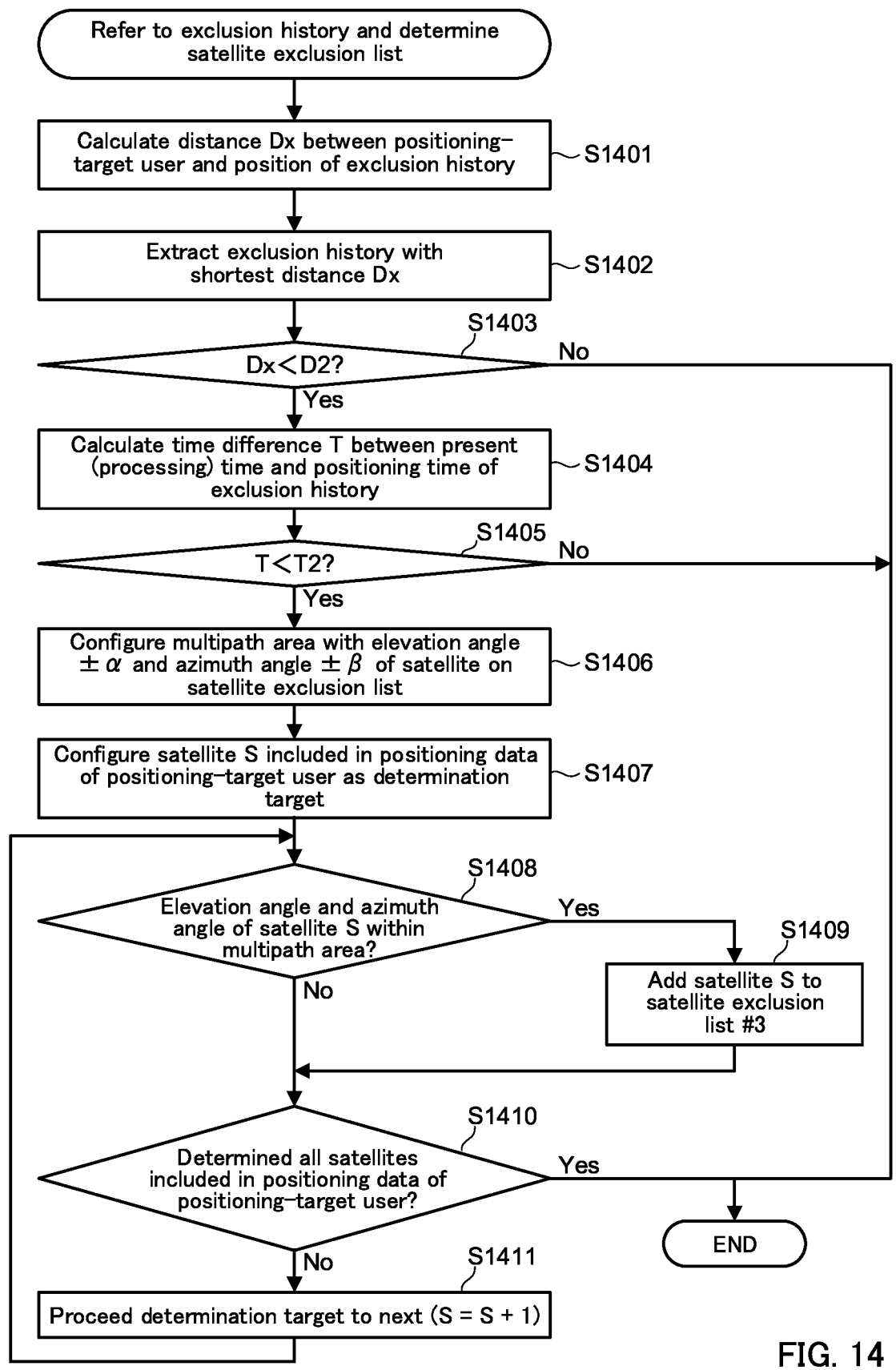
FIG. 14 is a flowchart describing an exemplary processing of determining a satellite exclusion list illustrated in FIG. 6 (S607)

FIG. 14 is a flowchart describing an exemplary processing of determining the satellite exclusion list (S607 of FIG. 6). As illustrated in FIG. 14, cloud server 40 refers to the previous "exclusion history" stored in storage 402 in S610 of FIG. 6. Cloud server 40 then calculates distances Dx between RTK-positioning-target user 20 and positions of previous RTK-positioning-target users 20 registered in the "exclusion history" (S1401). Note that RTK-positioning-target user 20 at the present (processing) time and the previous RTK-positioning-target users 20 registered in the "exclusion history" need not be the same user.

Cloud server 40 selects (or extracts) the "exclusion history" with the shortest calculated distance Dx (S1402). The reason for selecting the "exclusion history" with the shortest calculated distance Dx is that changes in multipath depend on a propagation path between user 20 and a satellite, especially a surrounding environment such as buildings on the ground. That is, for previous RTK-positioning-target user 20 located close to RTK-positioning-target user 20, the received positioning signal is likely to have been affected by the same multipath when a positional relation with the satellite is not much changed, unless there is a change in the surrounding environment such as buildings on the ground.

To be more specific, when multipath has occurred in a positioning signal received by previous RTK-positioning-target user 20 from a satellite located in the south, causes (e.g., tall buildings) of the multipath are highly likely to still exist in the south at the present time.

Thus, when the RTK-positioning-target user is located close to the previous RTK-positioning-target user, multipath is likely to occur in a positioning signal from a satellite in a close positional relation (south in this case) due to the same causes as in the past, regardless of whether the satellite is the same as the satellite for which multipath occurred in the past.

In addition, previous RTK-positioning-target user 20 may be located at exactly the same position, for example, when RTK positioning is performed at the same position as the position where the RTK positioning was performed in the past, for system maintenance or the like. Thus, selecting the "exclusion history" with the shortest distance Dx makes it easier to find such previous RTK-positioning-target user 20.

After selecting the "exclusion history", cloud server 40 determines whether distance Dx is shorter than threshold D2 (S1403). When distance Dx is shorter than threshold D2 (Yes in S1403), cloud server 40 calculates difference (time difference) T between the present (processing) time and positioning time in the "exclusion history" (S1404). Note that cloud server 40 may terminate the processing when distance Dx is equal to or greater than threshold D2 (NO in S1403).

Cloud server 40 then determines whether time difference T is smaller than threshold T2 (S1405). This threshold determination for time difference T corresponds to determining how recent the selected "exclusion history" is generated.

When time difference T is equal to or greater than threshold T2 (No in S1405), cloud server 40 determines that the selected "exclusion history" is old, and may terminate the processing of determining the satellite exclusion list.

When time difference T is smaller than threshold T2 (Yes in S1405), cloud server 40 determines that the selected "exclusion history" is new, and configures a pseudo (or virtual) multipath area based on position information of the excluded satellite registered in the "exclusion history" (S1406).

Figure 15:
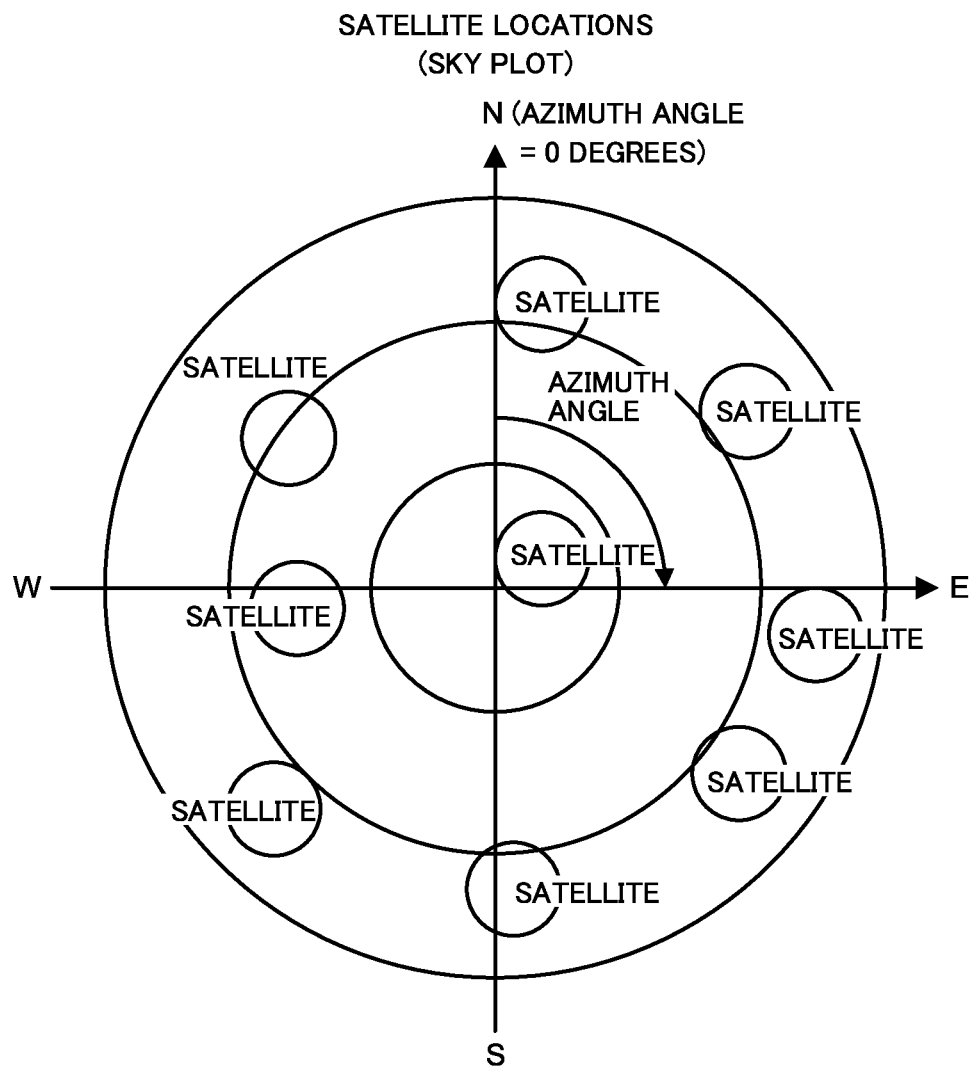
FIG. 15 is a diagram visually illustrating an exemplary processing of configuring a multipath area illustrated in FIG. 14 (S1406)

For example, cloud server 40 configures a "multipath area" with reference to an elevation angle and an azimuth angle of the excluded satellite. The area (range) is defined by the elevation angle±α and the azimuth angle±β. FIGS. 15 to 17 illustrate non-limiting examples related to the "multipath area" configuration.

FIG. 15 illustrates an exemplary sky plot of satellite locations. The sky plot illustrated in FIG. 15 is obtained by plotting positions of the satellites in the sky on the plane with reference to (with the origin of) the position (coordinates X, Y, and Z) of user 20 selected as the RTK positioning target. In FIG. 15, the azimuth angle is based on "north" (azimuth angle=0 degrees), and the elevation angle is higher as it is closer to the origin (the origin corresponds to the elevation angle=90 degrees).

Figure 16:
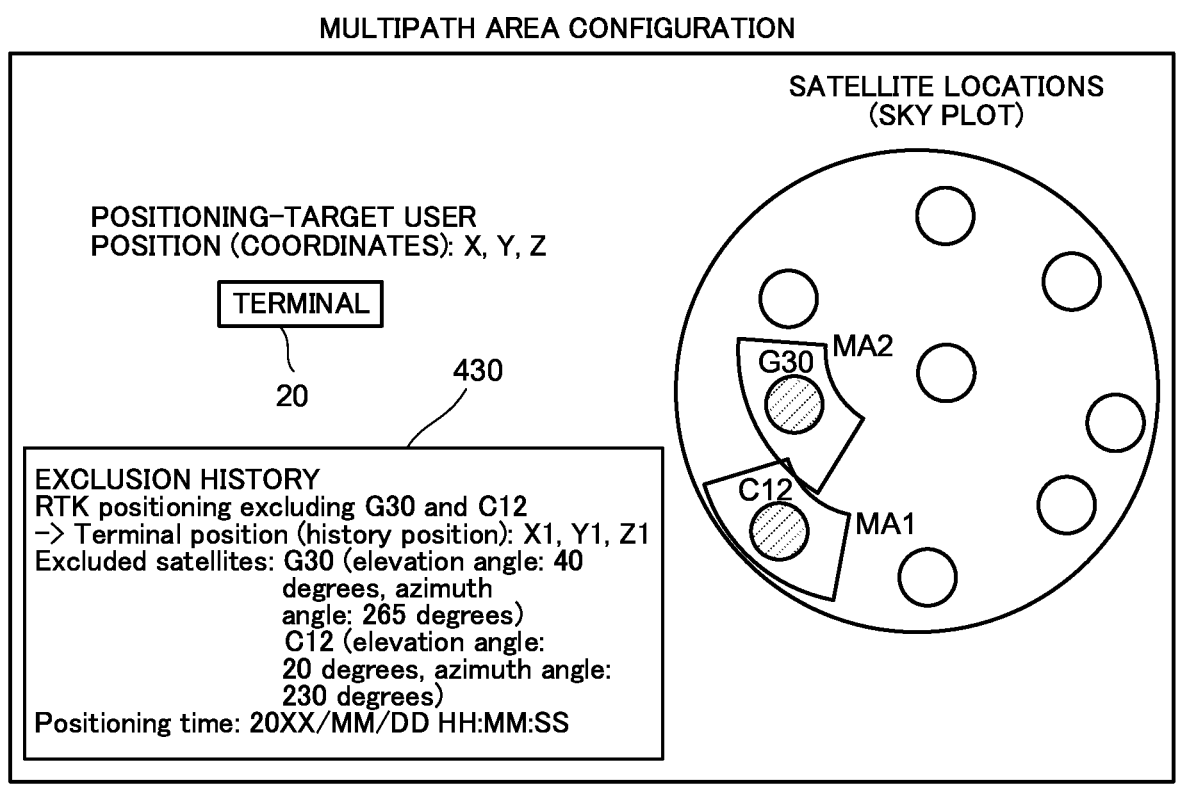
FIG. 16 is another diagram visually illustrating the exemplary processing of configuring a multipath area illustrated in FIG. 14 (S1406)
Figure 17:
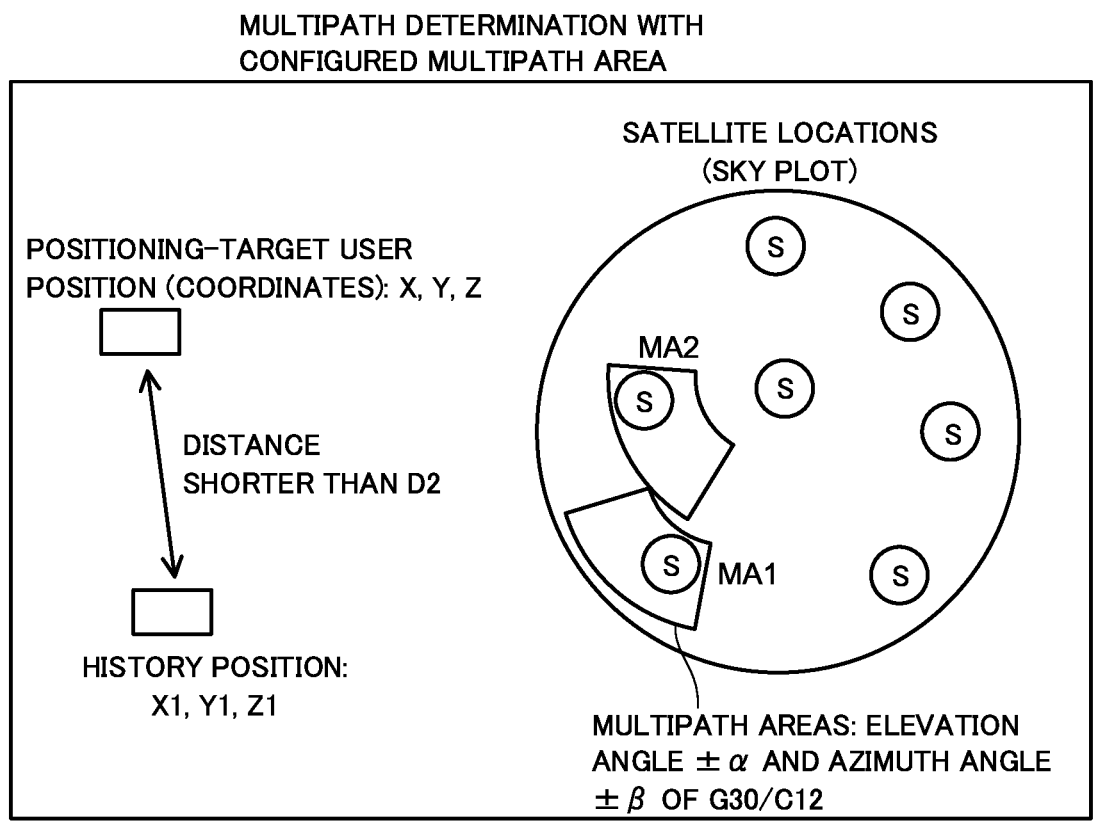
FIG. 17 is still another diagram visually illustrating the exemplary processing of configuring a multipath area illustrated in FIG. 14 (S1406).

When satellites C12 and G30 are excluded by the SNR comparison as described in FIG. 13, the information indicated by reference sign 430 in FIG. 16 is registered in the "exclusion history". The exclusion history includes, for example, position information (the elevation angle and the azimuth angle) of excluded satellites C12 and G30, and time (positioning time) information of the RTK positioning performed excluding satellites C12 and G30. In addition, FIG. 16 illustrates the positions of excluded satellites C12 and G30 on the sky plot.

The "multipath areas" defined by the elevation angle±α and the azimuth angle±β with reference to the positions of excluded satellites C12 and G30 respectively correspond to the areas surrounded by frames MA1 and MA2 on the sky plot as illustrated in FIG. 16, for example. Note that the values of the elevation angle±α and the azimuth angle±β may be set to different values for respective satellites.

As described above, cloud server 40 determines that the "exclusion history" with shortest distance Dx and the positioning time closest to the present (processing) time best represents the multipath environment at the position of current RTK-positioning-target user 20, and configures the "multipath area" based on the "exclusion history".

When the positional relation between user 20 and a satellite is not much changed, the reception environment of terminal 20 can also be regarded to have little change unless the surrounding environment changes suddenly, since changes in multipath depend on the surrounding environment such as buildings on the ground.

Thus, the configuration of the "multipath area" based on the "exclusion history" described above is unlikely to cause a determination error in exclusion determination processing (S1408) to be described later. When the "exclusion history" is too old, however, the surrounding environment (multipath environment) of RTK-positioning-target user 20 has possibly been changed. This is why the use of the old "exclusion history" is excluded by threshold T2.

After the configuration of the multipath area, cloud server 40 configures the satellite (S) identified by the satellite information included in the positioning data received from RTK-positioning-target user 20 as an exclusion determination target (S1407), as illustrated in FIG. 14.

Cloud server 40 then determines whether the elevation angle and the azimuth angle of satellite S are included in the multipath area (S1408). FIG. 17 illustrates an exemplary case where cloud server 40 determines whether the position of satellite S included in the positioning data received from current RTK-positioning-target user 20 is included in multipath area MA1 or MA2 configured in FIG. 16. FIG. 17 also indicates that the position (history position) of previous RTK-positioning-target user 20 is (X1, Y1, Z1) with respect to the position of current RTK-positioning-target user 20 (X, Y, Z), and distance Dx between the two is shorter than threshold D2.

FIG. 17 illustrates an example in which satellites S respectively located within multipath areas MA1 and MA2 are excluded. However, when a plurality of satellites S are located within single multipath area MA1 or MA2, corresponding satellites S are excluded. That is, a plurality of satellites S may be included in single multipath area MA1 or MA2.

In addition, satellite S included in multipath area MA1 is the same satellite as satellite C12 illustrated in FIG. 16 in some cases, and may be a different satellite in other cases. Likewise, satellite S included in multipath area MA2 is the same satellite as satellite G30 illustrated in FIG. 16 in some cases, and may be a different satellite in other cases. Regardless of the satellite S numbers, satellite S within multipath area MA1 or MA2 may be selected as an excluded satellite in S1409 to be described below.

When the elevation angle and the azimuth angle of satellite S are included in the multipath area (Yes in S1408), cloud server 40 registers (adds) satellite S in satellite exclusion list #3 (S1409).

When the elevation angle and the azimuth angle of satellite S are not included in the multipath area (No in S1408), cloud server 40 determines whether the exclusion determination has been performed on all the satellites identified from the positioning data received from RTK-positioning-target user 20 (S1410).

When determining that the exclusion determination has been performed on all satellites (Yes in S1410), cloud server 40 may terminate the processing of determining the satellite exclusion list.

When determining that there is a satellite yet to be subjected to the exclusion determination (No in S1410), cloud server 40 configures another satellite as the satellite subjected to the exclusion determination (S=S+1) (S1411), and repeats the processing from S1408.

Note that information of satellite exclusion lists #1 and #3 among above-described satellite exclusion lists #1, #2, and #3 need not be registered or reflected in the "exclusion history". Only information of satellite exclusion list #2 needs to be registered or reflected in the "exclusion history" to be used for the configuration of the pseudo multipath area.

As described above, when user 20 as the SNR comparison target cannot be selected, cloud server 40 configures the multipath area based on the position information of the satellites excluded in the previous positioning calculation at or near the position of current RTK-positioning-target user 20.

Cloud server 40 then excludes the satellites included in the multipath area from the candidate satellites to be used for the RTK calculation. Thus, the RTK positioning accuracy of SNR-positioning-target user 20 can be improved even when user 20 as the SNR comparison target cannot be selected.

<Others>

Although various embodiments have been described above with reference to the drawings, it goes without saying that the present disclosure is not limited to foregoing embodiments. It is obvious that those skilled in the art can conceive various modifications or variations within the scope recited in the claims, and such modifications and variations also naturally fall within the technical scope of the present disclosure. Further, any components in the embodiments described above may be combined as appropriate without departing from the gist of the present disclosure.

In each of the embodiments described above, the present disclosure has been described with examples in which hardware is used to configure the present disclosure. However, the present disclosure can be realized by software in cooperation with hardware.

In addition, the user number optimization processing among directions in the above-described embodiment (including variations) includes the processing of selecting (or extracting) closest user 20 in each of the number M of divided areas, but the present disclosure is not limited to this. For example, a predetermined number or less of users 20 may be selected (or extracted) in the order of proximity in each direction.

Further, in the above-described embodiment (including variations), the group of users is extracted prior to the user number optimization processing among directions, but the present disclosure is not limited to this. The extraction of the group of users may be omitted, for example, and user 20 closest to RTK-positioning-target user 20 may be selected (or extracted) in each of the number M of divided areas. Selected (or extracted) users 20 may also be excluded when such users 20 satisfy an exclusion condition (the user is not a moving object, or located too close or too far) in the processing of extracting the group of users (when performed).

Each functional block used in the description of each embodiment, which includes variations, described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g. cellular (cell) phone, smart phone), a tablet, a personal computer (PC) (e.g, laptop, desktop, netbook), a camera (e.g. digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

It should be noted that the present disclosure can be represented as a control method performed in a radio communication apparatus or a control apparatus. Further, the present disclosure can also be represented as a program for causing the control method to be operated with a computer. In addition, the present disclosure can be also represented as a recording medium where the program is recorded so as to be readable by a computer. That is, the present disclosure may be represented in any category of devices, methods, programs, and recording media.

It should also be noted that the present disclosure is not limited to the embodiments described above in terms of, for example, the type, the arrangement, the number of members, and alterations can be made as appropriate without departing from the scope of the present invention by, for example, appropriately substituting the components with those having equivalent operational effects.

The disclosure of Japanese Patent Application No. 2018-199918, filed on Oct. 24, 2018, including the specification, drawings and abstract, is incorporated herein by reference in its entirety.

INDUSTRIAL APPLICABILITY

The present disclosure is suitable for technologies to perform positioning, using radio waves transmitted from satellites.

REFERENCE SIGNS LIST

1 Satellite positioning system
20 Positioning terminal
40 Cloud server
201, 401 Processor
202, 402 Storage
203, 403 Input
204, 404 Output
205, 405 Communicator
206 Receiver
210, 410 Bus
MA1, MA2 Multipath area

The invention claimed is:
1. A server, comprising:
a receiver configured to receive, from each of a plurality of positioning terminals receiving positioning signals transmitted from a plurality of satellites, positioning data generated based on the positioning signals;

a processor configured to perform positioning calculation for a position of a first positioning terminal among the plurality of positioning terminals, wherein the processor is further configured to:
detect a difference, for each of the plurality of satellites based on the positioning data, between reception quality of the positioning signal in the first positioning terminal and reception quality of the positioning signal in at least one second positioning terminal;
determine at least one of the plurality of satellites to be used for the positioning calculation for the first positioning terminal based on the difference for each of the plurality of satellites;
estimate the position of the first positioning terminal based on the positioning data received from the first positioning terminal;
select, as the second positioning terminal, at least one of the plurality of positioning terminals other than the first positioning terminal located within a first set distance from the estimated position; and
exclude at least one of the plurality of positioning terminals located within a second set distance shorter than the first set distance from selection candidates for the second positioning terminal, and the server further comprises:
a display outputting a result of the positioning calculation.

2. The server according to claim 1, wherein the processor is further configured to:
expand the first set distance to select the second positioning terminal when a predetermined threshold number or more of the at least one of the plurality of positioning terminals other than the first positioning terminal are not present within the first set distance.

3. The server according to claim 2, wherein the processor is further configured to:
construct a pseudo multipath area based on position information of a satellite excluded based on the difference in previous positioning calculation at or near the position of the first positioning terminal, when the at least one of the plurality of positioning terminals other than the first positioning terminal is not present within the expanded distance, and
exclude at least one of the plurality of satellites included in the multipath area from satellite candidates to be used for the positioning calculation.

4. The server according to claim 1, wherein the processor is further configured to:
divide an area defined by the first set distance into areas in a plurality of directions respectively; and
select a plurality of the second positioning terminals so as to level the number of terminals selected as the second positioning terminals among the divided areas.

5. The server according to claim 1, wherein the processor is further configured to determine the at least one of the plurality of satellites to be used for the positioning calculation by excluding at least one of the plurality of satellites with the difference exceeding a predetermined threshold.

6. The server according to claim 1, wherein the determining the at least one of the plurality of satellites to be used for the positioning calculation comprises excluding at least one of the plurality of satellites with the reception quality lower than a predetermined threshold.

7. A satellite positioning system, comprising:
a plurality of positioning terminals that generate positioning data based on positioning signals received from a plurality of satellites; and
a server configured to:
receive the positioning data from each of the plurality of positioning terminals;
perform positioning calculation for a position of a first positioning terminal among the plurality of positioning terminals; and
output a result of the positioning calculation,
wherein being configured to perform the positioning calculation comprises being configured to:
detect a difference, for each of the plurality of satellites based on the positioning data, between reception quality of the positioning signal in the first positioning terminal and reception quality of the positioning signal in at least one second positioning terminal;
determine at least one of the plurality of satellites to be used for the positioning calculation for the first positioning terminal based on the difference for each of the plurality of satellites;
estimate the position of the first positioning terminal based on the positioning data received from the first positioning terminal;
select, as the second positioning terminal, at least one of the plurality of positioning terminals other than the first positioning terminal located within a first set distance from the estimated position; and
exclude at least one of the plurality of positioning terminals located within a second set distance shorter than the first set distance from selection candidates for the second positioning terminal.

8. A satellite positioning method, comprising:
transmitting to a server, by each of a plurality of positioning terminals, positioning data generated based on positioning signals received from a plurality of satellites;
detecting, by the server, for each of the plurality of satellites based on the positioning data, a difference between reception quality of the positioning signal in a first positioning terminal and reception quality of the positioning signal in at least one second positioning terminal;
determining, by the server, at least one of the plurality of satellites to be used for positioning calculation for the first positioning terminal based on the difference for each of the plurality of satellites;
performing, by the server, the positioning calculation for a position of the first positioning terminal based on a result of the determination, wherein the performing the positioning calculation comprises:
estimating, by the server, the position of the first positioning terminal based on the positioning data received from the first positioning terminal;
selecting, as the second positioning terminal, by the server, at least one of the plurality of positioning terminals other than the first positioning terminal located within a first set distance from the estimated position; and
excluding at least one of the plurality of positioning terminals located within a second set distance shorter than the first set distance from selection candidates for the second positioning terminal; and
outputting, by the server, a result of the positioning calculation.

* * * * *